(12) United States Patent
Mantooth et al.

(10) Patent No.: US 11,693,376 B1
(45) Date of Patent: Jul. 4, 2023

(54) SMART GREEN POWER NODE

(71) Applicants: Homer Alan Mantooth, Fayetteville, AR (US); Yuzhi Zhang, Fayetteville, AR (US); Janviere Umuhoza, Fayetteville, AR (US); Shuang Zhao, Fayetteville, AR (US); Stephen Joe Moquin, Fayetteville, AR (US); Roger A. Dougal, Columbia, SC (US)

(72) Inventors: Homer Alan Mantooth, Fayetteville, AR (US); Yuzhi Zhang, Fayetteville, AR (US); Janviere Umuhoza, Fayetteville, AR (US); Shuang Zhao, Fayetteville, AR (US); Stephen Joe Moquin, Fayetteville, AR (US); Roger A. Dougal, Columbia, SC (US)

(*) Notice: Subject to any disclaimer, the term of this patent is extended or adjusted under 35 U.S.C. 154(b) by 302 days.

(21) Appl. No.: 17/109,752

(22) Filed: Dec. 2, 2020

Related U.S. Application Data

(63) Continuation-in-part of application No. 15/813,982, filed on Nov. 15, 2017, now abandoned.

(60) Provisional application No. 62/422,473, filed on Nov. 15, 2016.

(51) Int. Cl.
*G05B 13/04* (2006.01)
*G05B 13/02* (2006.01)
*H02M 1/08* (2006.01)
*H02M 3/335* (2006.01)

(52) U.S. Cl.
CPC ....... *G05B 13/048* (2013.01); *G05B 13/0265* (2013.01); *H02M 1/08* (2013.01); *H02M 3/335* (2013.01)

(58) Field of Classification Search
CPC ... G05B 13/048; G05B 13/0265; H02M 1/08; H02M 3/335
USPC .......................................................... 703/18
See application file for complete search history.

(56) References Cited

U.S. PATENT DOCUMENTS

| | | | |
|---|---|---|---|
| 3,566,143 A | 2/1971 | Paine | 307/126 |
| 5,500,791 A | 3/1996 | Kheraluwala et al. | 363/17 |
| 7,274,975 B2 | 9/2007 | Miller | 700/295 |
| 7,873,442 B2 | 1/2011 | Tsui | 700/291 |
| 8,019,697 B2 | 9/2011 | Ozog | 705/412 |
| 2008/0039979 A1 | 2/2008 | Bridges et al. | 700/292 |
| 2008/0219186 A1 | 9/2008 | Bell et al. | 370/254 |
| 2011/0148195 A1 | 6/2011 | Lee | 307/25 |
| 2012/0014138 A1* | 1/2012 | Ngo | H02M 3/33584 363/17 |

(Continued)

FOREIGN PATENT DOCUMENTS

CN 101630840 1/2010

OTHER PUBLICATIONS

Dutta, Sumit, Samir Hazra, and Subhashish Bhattacharya. "A digital predictive current-mode controller for a single-phase high-frequency transformer-isolated dual-active bridge DC-to-DC converter." IEEE Transactions on Industrial Electronics 63.9 (2016). pp. 5943-5952. (Year: 2016).*

(Continued)

*Primary Examiner* — John E Johansen
(74) *Attorney, Agent, or Firm* — Keisling & Pieper PLC; David B. Pieper; Trent C. Keisling

(57) ABSTRACT

The present invention is directed to an improved smart green power node using predictive switching, predictive operation at a daily and hourly level, and both grid connected and island operating modes with built-in cybersecurity.

3 Claims, 25 Drawing Sheets

(56) References Cited

U.S. PATENT DOCUMENTS

2012/0130556 A1 5/2012 Marhoefer .................... 700/291
2013/0024042 A1 1/2013 Asghari et al. ............... 700/295
2014/0005852 A1 1/2014 Asghari et al. ............... 700/295
2014/0350743 A1 11/2014 Asghari et al. ............... 700/297

OTHER PUBLICATIONS

Huang, Jun, et al. "Unified triple-phase-shift control to minimize current stress and achieve full soft-switching of isolated bidirectional DC-DC converter." IEEE Transactions on Industrial Electronics 63.7 (2016). pp. 4169-4179. (Year: 2016).*

Shuang Zhao et al.; Distributed Power Quality Enhancement Using Residential Power Routers; University of Arkansas, Fayetteville, AR 72701.

Dutta, Sumit, Samir Hazra, and Subhashish Bhattacharya, "A digital predictive current-mode controller for a single-phase high-frequency transformer-isolated dual-active bridge DC-to-DC converter." IEEE Transactions on Industrial Electronics 63.9 (2016), pp. 5943-5952. (Year: 2016).

Huang, Jun, et al., "Unified triple-phase-shift control to minimize current stress and achieve full soft-switching of isolated bidirectional DC-DC converter." IEEE Transactions on Industrial Electronics 63.7 (2016). pp. 4169-41679. (Year: 2016).

\* cited by examiner

SMART GREEN POWER NODE

CROSS-REFERENCE TO RELATED APPLICATIONS

This application claims priority to and is a continuation-in-part of U.S. application Ser. No. 15/813,982 filed on Nov. 15, 2017 by Mantooth et al. which is a continuation-in-part of U.S. Provisional Application Ser. No. 62/422,473 filed on Nov. 15, 2016 by Mantooth et al. Each of these prior applications are incorporated by reference in their entirety.

STATEMENT REGARDING FEDERALLY SPONSORED RESEARCH OR DEVELOPMENT

Not Applicable.

REFERENCE TO A MICROFICIHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in power routers and photovoltaic panel connections to residential loads and electric power grids. More particularly, the invention relates to improvements particularly suited for power flow management and communication. In particular, the present invention relates specifically to a smart green power node with power routing using model predictive control and communication capabilities.

2. Description of the Known Art

As will be appreciated by those skilled in the art, power systems are known in various forms. Patents disclosing information relevant to power systems include:

U.S. Pat. No. 3,566,143, issued to Paine et al. on Feb. 23, 1971 entitled Maximum power point tracker:

U.S. Pat. No. 5,500,791, issued to Kheraluwala, et al. on Mar. 19, 1996 entitled Power distribution system for generating regulated DC output voltages using a dual active bridge converter driven from an unregulated DC source:

U.S. Pat. No. 7,274,975, issued to Miller on Sep. 25, 2007 entitled Optimized energy management system;

U.S. Pat. No. 7,873,442, issued to Tsui on Jan. 18, 2011 entitled System and method for managing and optimizing power use;

U.S. Pat. No. 8,019,697, issued to Ozog on Sep. 13, 2011 entitled Optimization of microgrid energy use and distribution:

United States Patent Application 20080219186 A1, filed by Bell; Ray; et al. on Sep. 11, 2008 entitled ENERGY SWITCH ROUTER:

United States Patent Application 20080039979 A1, filed by Bridges; Seth W.; et al. on Feb. 14, 2008 entitled Smart Islanding and Power Backup in a Power Aggregation System for Distributed Electric Resources;

United States Patent Application No. 20110148195A1, filed by Lee; Eun-Ra published on Jun. 23, 2011 entitled ENERGY STORAGE SYSTEM AND METHOD OF CONTROLLING THE SAME;

United States Patent Application 20120130556 A1, filed by Marhoefer; John J. on May 24, 2012 entitled VIRTUAL POWER PLANT SYSTEM AND METHOD INCORPORATING RENEWAL ENERGY, STORAGE AND SCALABLE VALUE-BASED OPTIMIZATION;

United States Patent Application 20130024042 A1, filed by Asghari; Babak; et al. on Jan. 24, 2013 entitled METHOD FOR. REAL-TIME POWER MANAGEMENT OF A GRID-TIED MICROGRID TO EXTEND STORAGE LIFETIME AND REDUCE COST OF ENERGY;

United States Patent Application 20140005852 A1, filed by Asghari; Babak; et al. on Jan. 2, 2014 entitled REDUCTION OF OPERATIONAL COST USING ENERGY STORAGE MANAGEMENT AND DEMAND RESPONSE;

United States Patent Application 20140350743 A1, filed by Asghari; Babak; et al. on Nov. 27, 2014 entitled TIERED POWER MANAGEMENT SYSTEM FOR MICROGRIDS;

Chinese Patent Application CN101630840A, filed by Inventor(s): SHI JING; XIA LIU; JIAN LI; CHANGHUA ZHANG; QI HUANG; YONG CHEN; QUNYING LIU; JIANBO YI+, Applicant(s): UNIV ELECTRONIC SCIENCE & TECH and published 2010 Jan. 20 entitled Intelligent control system for microgrid energy. The abstract reads: The invention relates to a miniature power supplying system containing a plurality of distributed power supplies, and discloses an intelligent energy control system capable of controlling a microgrid by using forecast information. The intelligent control system for microgrid energy comprises a microgrid system and a control system, wherein the microgrid system comprises a power supply unit, an energy storage unit and a load unit, and the control system comprises an information collecting system and a central processing unit. The central processing unit comprises a load forecasting module, a microgrid online status estimating module, an energy forecasting module of an intermittent power supply energy forecasting and storing unit, a microgrid system analyzing module and a microgrid multiobjective optimization operation and comprehensive coordination control module. The intelligent control system for microgrid energy can control the microgrid according to the forecast information and accomplish the intelligent operation of the microgrid.

IEEE Transactions on Power Electronics (Volume: 9, Issue: 1 Jan. 1994) "Calculation of leakage inductance in transformer windings." The abstract reads as follows: A formula is presented to calculate mutual impedance between transformer windings on ferromagnetic cores. The formula is based on the solution of Maxwell's equations for coils on ferromagnetic cores and as such offers the ultimate in accuracy. The formula is frequency dependent, taking into account the effect of eddy currents in the core on the flux distribution as well as representing the eddy current core loss as an equivalent resistance. Experimental results are presented for leakage inductance and an illustrative example is presented showing how leakage inductance affects the operation of a typical switching mode power supply. Approximations for the formula are also presented to simplify the calculations under certain operating conditions.

Energy Conversion Congress and Exposition (ECCE) 2012 conference paper: "Design and Evaluation of a Universal Power Router for Residential Applications, published September 15-20, 2012. The abstract reads as follows: The next generation universal power routing system has been developed for residential use; compared to energy management systems that already exist, this system effectively reduces the need for human interaction through automation of home power usage. The Smart Green Power Node (smart green power node) manages on-site energy resources coupled at a DC link that feeds a bi-directional grid-tied inverter supplying loads within a home via a 240 V AC bus. It incorporates all relevant data such as weather, Time of Use pricing, appliance energy usage, user preferences, status of on-site resources, and communications to intelligently manage the power flow between those on-site energy resources, the electric grid, and the loads. Additionally, it has the capability to maintain power to the home in the event of a power outage and will continue to intelligently provide power while islanded from the grid. The system functionality has been verified through simulations and a prototype has been developed and evaluated.

Power Electronics for Distributed Generation Systems (PEDG), 2013 conference paper: "Design and Evaluation of a Next Generation Residential Energy Management System", Jul. 9, 2013. The abstract reads as follows: This paper introduces the concept, development, and evaluation of the next generation in demand side energy management. An integrated hardware/software 2 kW prototype has been designed, built, and currently undergoing testing. The Smart Green Power Node (smart green power node) features a modular architecture such that it can be customized for user-specific applications. Additionally, the smart green power node incorporates necessary data such as weather for projected photovoltaic generation, user input, hardware status and load profile information, as well as a TOU pricing schedule as inputs to a novel system control algorithm. Compared to commercial energy management systems that exist, this system effectively eliminates the need for human interaction by processing the described data and intelligently controlling the charging/discharging of onsite resources in conjunction with the electric grid to yield economic savings for the home owner as well as the utility.

Energy Conversion Congress and Exposition (ECCE) 2014 conference paper: "Optimized Control of isolated Residential Power Router for Photovoltaic Applications". Sep. 15, 2014. The abstract reads as follows: This paper proposes an optimized control of the hardware of a residential power router for photovoltaic applications. The design of the hardware topology is described in this paper. Solar panels, which act as the green power input, are connected through a boost converter to an isolated dual-half-bridge and integrated with a full-bridge inverter to provide a 60 Hz voltage at the ac bus to supply traditional residential loads. The proposed maximum power point tracking control for photovoltaics begins with constant voltage tracking and then adopts a variable duty cycle step-size perturbation and observation to improve the accuracy of the photovoltaics power tracking. Furthermore, to significantly reduce the voltage error for the grid-tied inverter, the proposed direct quadrature (D-Q) rotating frame control provides much better performance over a normal proportional-integral-derivative (PID) control. Simulation and experimental results reported in this paper verify the functionality of the hardware topology of the power router system and its optimized controller.

Applied Power Electronics Conference and Exposition (APEC), 2015/JESTPE Paper: "Optimizing Efficiency and Performance for Single-Phase Photovoltaic Inverter with Dual-Half Bridge Converter", Mar. 19, 2015. The abstract reads as follows: An isolated photovoltaic converter for residential use and its control strategies are investigated in this paper. This technique provides galvanic isolation and simplified control while still meeting high conversion efficiencies and wide input voltage range requirements. Through designing the equivalent resonant capacitor and inductor, zero-voltage switching (ZVS) and zero-current switching (ZCS) are realized. Efficiency is dramatically increased by reducing the circulating energy during each switching cycle. In order to analyze the resonant converter and achieve better performance, an optimal state-trajectory control is investigated and implemented. To significantly reduce the voltage error and achieve a better transient response for the grid-tied mode operation, the proposed direct-quadrature (D-Q) frame control is used instead of a normal PID control for the inverter. Simulation and experimental results reported in this paper verify the functionality of the proposed topology and the respective controller for optimizing efficiency and performance.

Applied Power Electronics Conference and Exposition (APEC) 2015 Paper: "Realizing an Integrated System for Residential Energy Harvesting and Management". Mar. 19, 2015. The abstract reads as follows: A new power conversion architecture for a residential power router is reported. In comparison to previously published architectures, this one offers higher efficiency and performance, and is more amenable to production for the emerging mass consumer market for systems to manage energy harvesting, storage, and consumption. The integrated system includes the hardware for dc-to-ac power conversion and system level controls for power flow and load management. For the hardware, the tracking resonant frequency (TRF) and direct-quadrature (D-Q) controls are respectively implemented in dual-half bridge (dual half bridge) to increase the system efficiency, and in the inverter to reduce the voltage error. For the system level controls, the power flow management is developed based on a rule-based algorithm using real-world time-of-use (TOU) electricity pricing data parsed from the Internet through the LabVIEW™-based communication interface. The simulation and experimental results reported in this paper verify the efficient dc/ac power conversion and the optimized performance of the integrated residential energy harvesting and management system.

Each of these patents, applications, and papers are hereby expressly incorporated by reference in their entirety. From these prior references it may be seen that these prior art is very limited in their teaching and utilization, and an improved power node is needed to overcome these limitations.

SUMMARY OF THE INVENTION

The present invention is directed to an improved smart green power node system using a suite of controls methods and algorithms. In the preferred embodiment, the Smart Green Power Node is a residential power router that controls the flow of power between the grid, on-site resources like solar panels or batteries, and on-site demands like air-conditioners or water heaters. In the present embodiment, the generation and consumption of power at the residence is predicted in advance. The flow of power is economized based on these predictions, present conditions, user input, and signals from grid utilities. Specifically, the time-of-use price of the grid is used to predict the battery charging/discharging cycling strategy. In case of power outage from the grid, the smart green power node can manage on-site resources to provide back-up power in an islanded mode of operation that meets grid interconnect standards such as IEEE 1547 and UL 1741.

The router is composed of dc/dc converters and an ac/dc inverter and is connected to on-site power generation, on-site power storage, on-site loads, and the power supply grid. The suite of control methods and algorithms manage individual converters and circuits, and manage the power flow through the entire system.

The smart green power node addresses two issues. The first is management of photovoltaic power, battery energy storage, and other energy sources and storage at the residence to realize the power flow balance. This includes using on-site resources to power the residence in case the grid fails to provide power or becomes unsafe. The second is economizing the use of power. This can be realized from renewable power generation and daily cycling of the battery based on the time-of-use electricity price.

The smart green power node is distinguished from both other residential power routers and grid power optimization systems. The state of the art residential power routers do not provide the predictive asset allocation based on weather forecasts, optimization of power management based on these predictions coupled with machine learning algorithms based on historical usage data, or back-up power/islanding capability of the smart green power node. No other grid power optimization systems operate at the residential level.

Advantages of the present invention include an integrated solution with sophisticated algorithms and hardware that requires minimal user input. The system provides peak shaving capability during high power demand times yielding economic savings for both the utility and the consumer. The system incorporates energy storage and "green" sources reducing carbon emissions. The system mitigates outage times by operating as independent power supply in an islanded operation mode. The system is customizable for diverse application landscapes thereby increasing utility.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

As shown in FIGS. 1-27 of the drawings, one exemplary embodiment of the present invention is generally shown as a Smart Green Power Node 100 with power management and communication capabilities.

Figure 16:
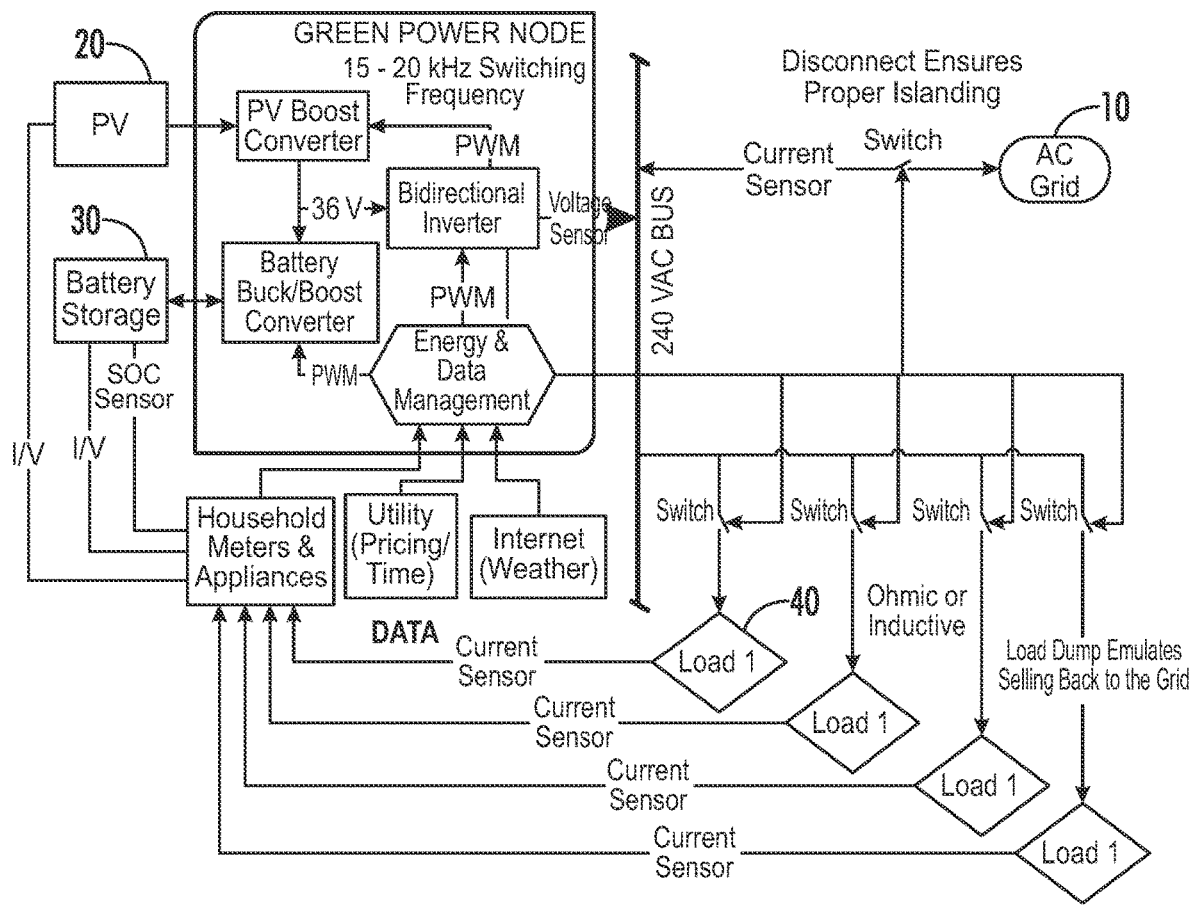
FIG. 16 shows a Smart Green Power Node Basic Functional Block Diagram.
Figure 17:
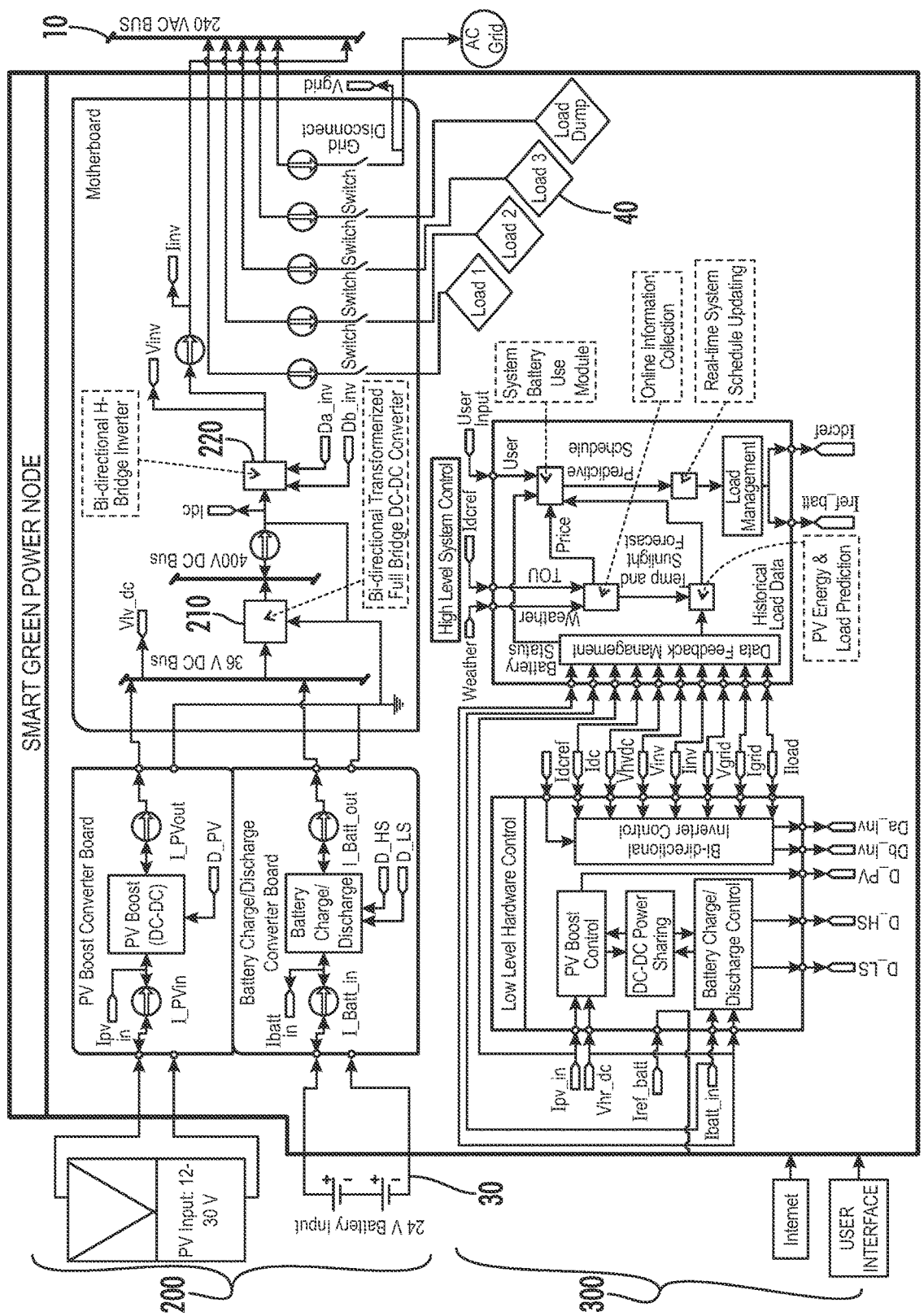
FIG. 17 shows a detailed functional block diagram.

As noted by FIGS. 16 and 17, the smart green power node 100 includes a power routing circuit 200 controlled by a processor 300 using a suite of control methods and algorithms. The power routing circuit 200 is composed of dc/dc converters 210 and an ac/dc inverter 220 and is connected to on-site power generation 20, on-site power storage 30, on-site loads 40, and the power supply grid 10. The suite of control methods and algorithms manage individual converters and circuits, and manage the power flow through the entire system.

Some basic technologies, circuit topologies, and control algorithms are used in the smart green power node 100. Namely, these are boost converters, buck/boost converters, maximum power point tracking, energy storage, dual active bridge converters, phase shift control, inverters, rectifiers, solar power generation prediction, load prediction, and combinatorial optimization.

1. Boost Converters and Maximum Power Point Tricking

Figure 1:
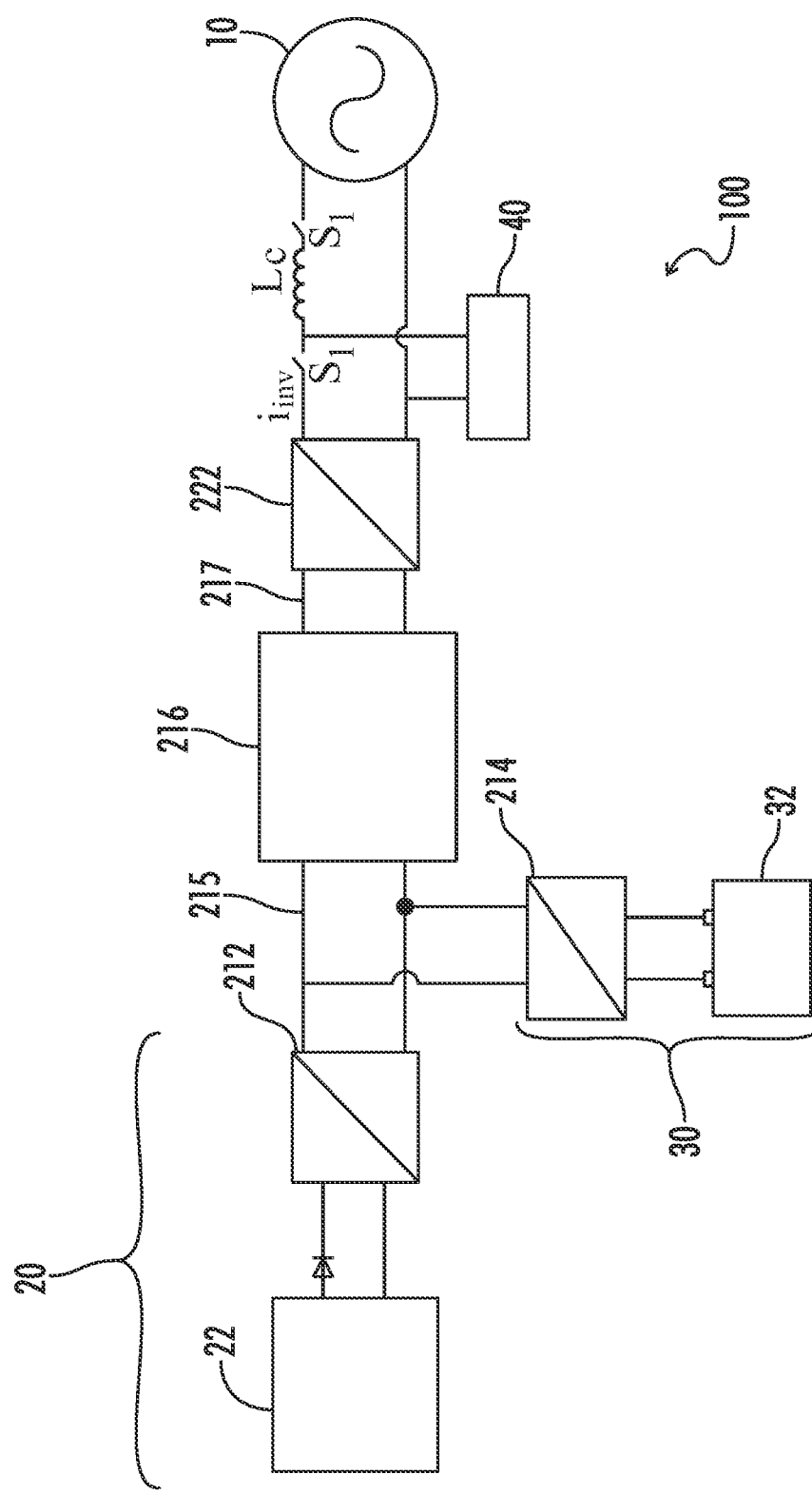
FIG. 1 is a schematic view of a smart green power router connected to the photovoltaic panels, battery, load, and power grid.
Figure 2:
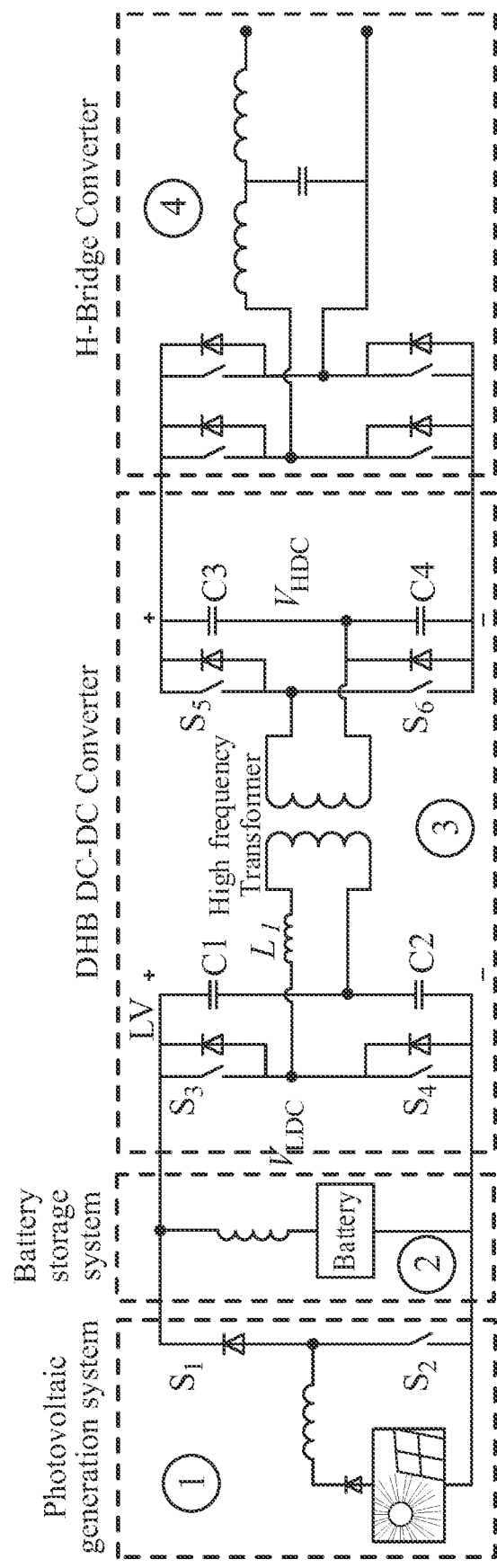
FIG. 2 is a schematic view of the power routing circuit of the smart green power node.

FIGS. 1 and 2 show the on-site power generation 20 with photovoltaic panels 22 in the smart green power node 100 can use a boost converter 212 with maximum power point tracking to manage photovoltaic power from the photovoltaic panels 22. The photovoltaic panels 22 are operated by a maximum power point tracking control such that the panels are operated at a specific voltage to maximize their efficiency and power. This low voltage, dc power is then converted to the appropriate voltage by the boost converter 212. Photovoltaic power can be routed to both the load 40 and the battery 30. The low voltage dc bus 215 of the smart green power node 100 can be energized by this photovoltaic power or other alternative forms such as wind or water turbines, geothermal power, etc.

2. Buck/Boost Converters and Energy Storage

FIGS. 1 and 2 show how the smart green power node 100 can use a buck/boost converter 214 to manage power flow into and out of a battery 32 which can be made as a battery bank 32. This battery bank 32 can be used as energy storage. The battery 32 receives and discharges its power onto the low voltage dc bus 215 of the smart green power node 100. Grid power 10 and photovoltaic power 20 can be stored in the battery bank 32. The usable life of a battery 32 may be extended if the battery 32 is charged or discharged at certain rates, and held between certain states of charge. In case of a loss of grid 10 power, the batteries 32 may be discharged to provide an uninterruptible power supply for the residence load 40.

3. Dual Active Bridge Converters and Phase Shift Control

As shown in FIGS. 1 and 2, power is moved from the low voltage dc bus 215 to the high voltage dc bus 217, and vice versa, through the dual active bridge converter 216. The dual active bridge converter 216 is a switch-mode power converter. The dual active bridge 216 is two sets of switches, a transformer, inductors, and a number of other circuits and elements, e.g. snubbers and voltage sensors. Changes in the timing of the switching are used to control the power flow and the efficiency of the dual active bridge 216. The relative change of this timing between the switches is phase shift control.

4. Inverters and Rectifiers

As shown in FIGS. 1 and 2, the high voltage dc bus 217 interfaces with the power grid 10 through the inverter/rectifier 222. The same topology can act as an inverter or a rectifier, depending on the controls used. The inverter/rectifier 222 converts dc to ac power or ac to dc power, respectively. The inverter 222 used on the smart green power node 100 is split phase, designed to interface with the voltage levels typical of a residence load 40. The inverter and rectifier 222 allow power to flow into or out of the high voltage dc bus 217, and thus into or out of the smart green power node 100 as a whole.

5. Solar Power Generation Prediction. Load Prediction, and Combinatorial Optimization Both the solar power 22 generated and the load 40 demands can be predicted. These predictions, based on machine learning algorithms of historical usage data and weather forecast data, along with other information such as the Time of Use price from the grid 10 utility, create many options for how to route power for best economy. Combinatorial optimization is a family of methods to select the best option or options from the possible ways to route power. The use of power prediction, information gathering, and optimization provide a scheme for greatest economy.

Items that distinguish the smart green power node of this invention include:

1) a model-based predictive dual-phase-shift control;
2) a condition monitoring and layered, energy-predictive control:
3) energy market controls, and
4) embedded cybersecurity methods.

1. Model-Based Predictive Dual-Phase-Shift Control

Figure 3:
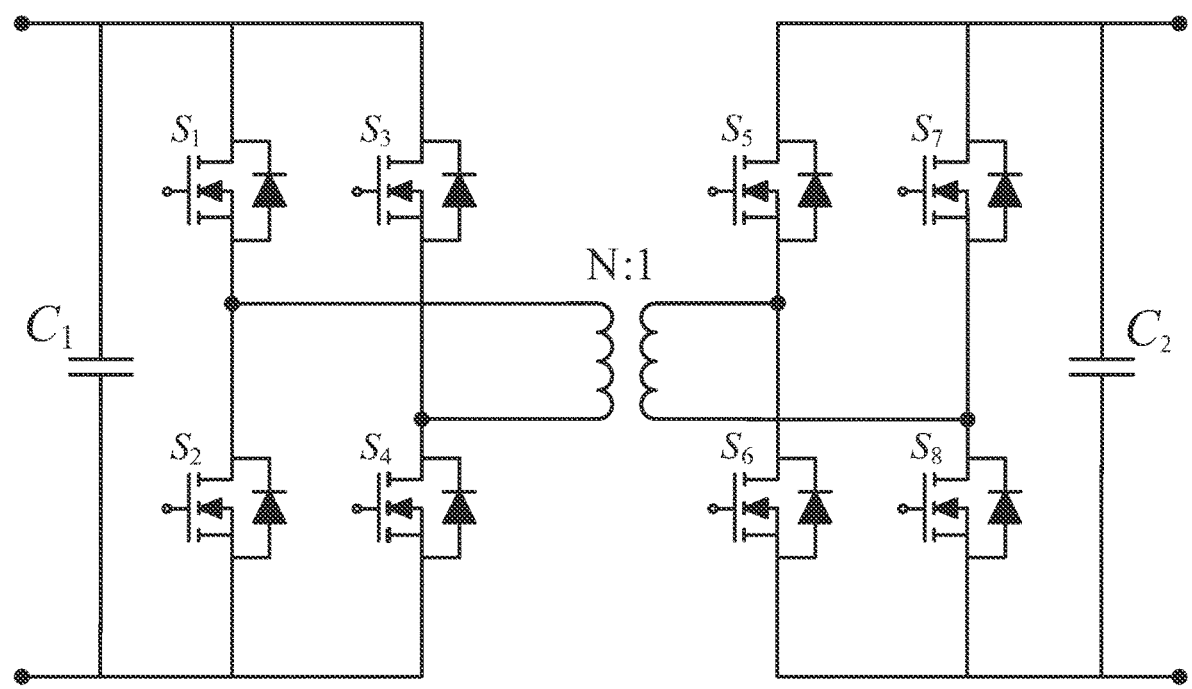
FIG. 3 is a schematic view of a dual half bridge circuit.
Figure 18:
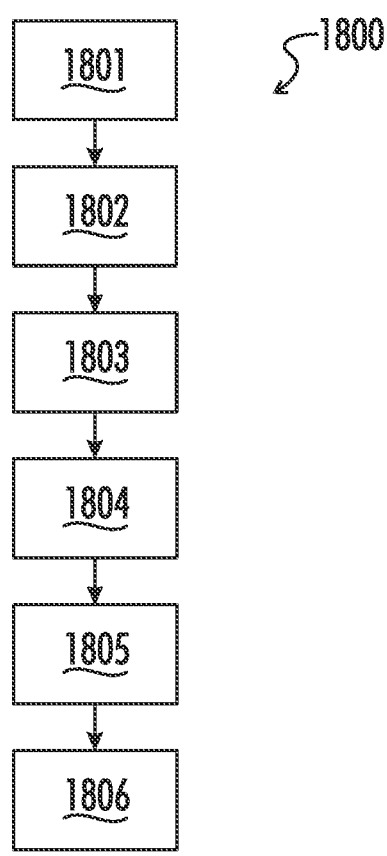
FIG. 18 shows the method for controlling the phase shift.
Figure 19:
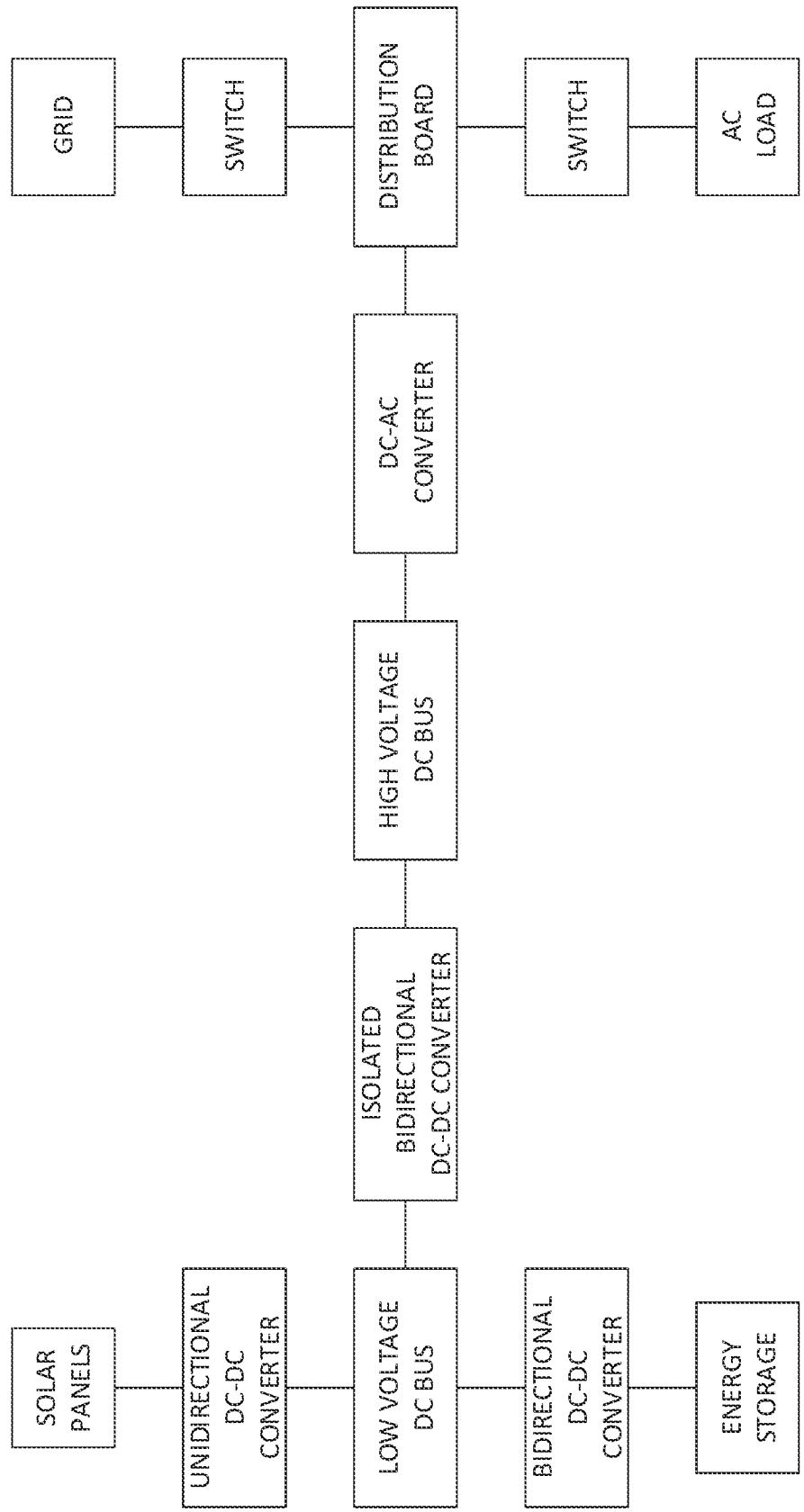
FIG. 19 shows another version of the smart green power node.
Figure 20:
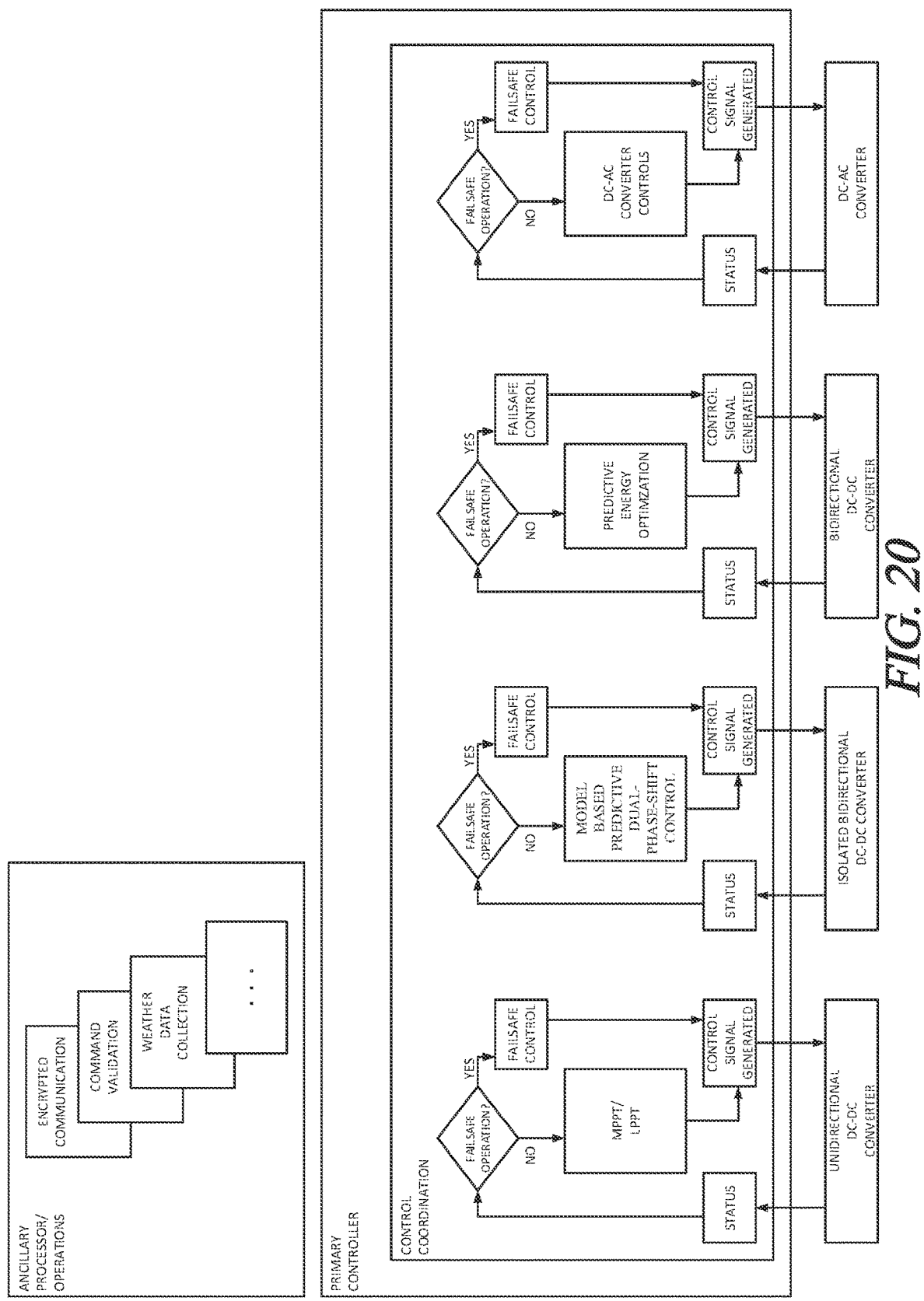
FIG. 20 shows the control process.
Figure 21:
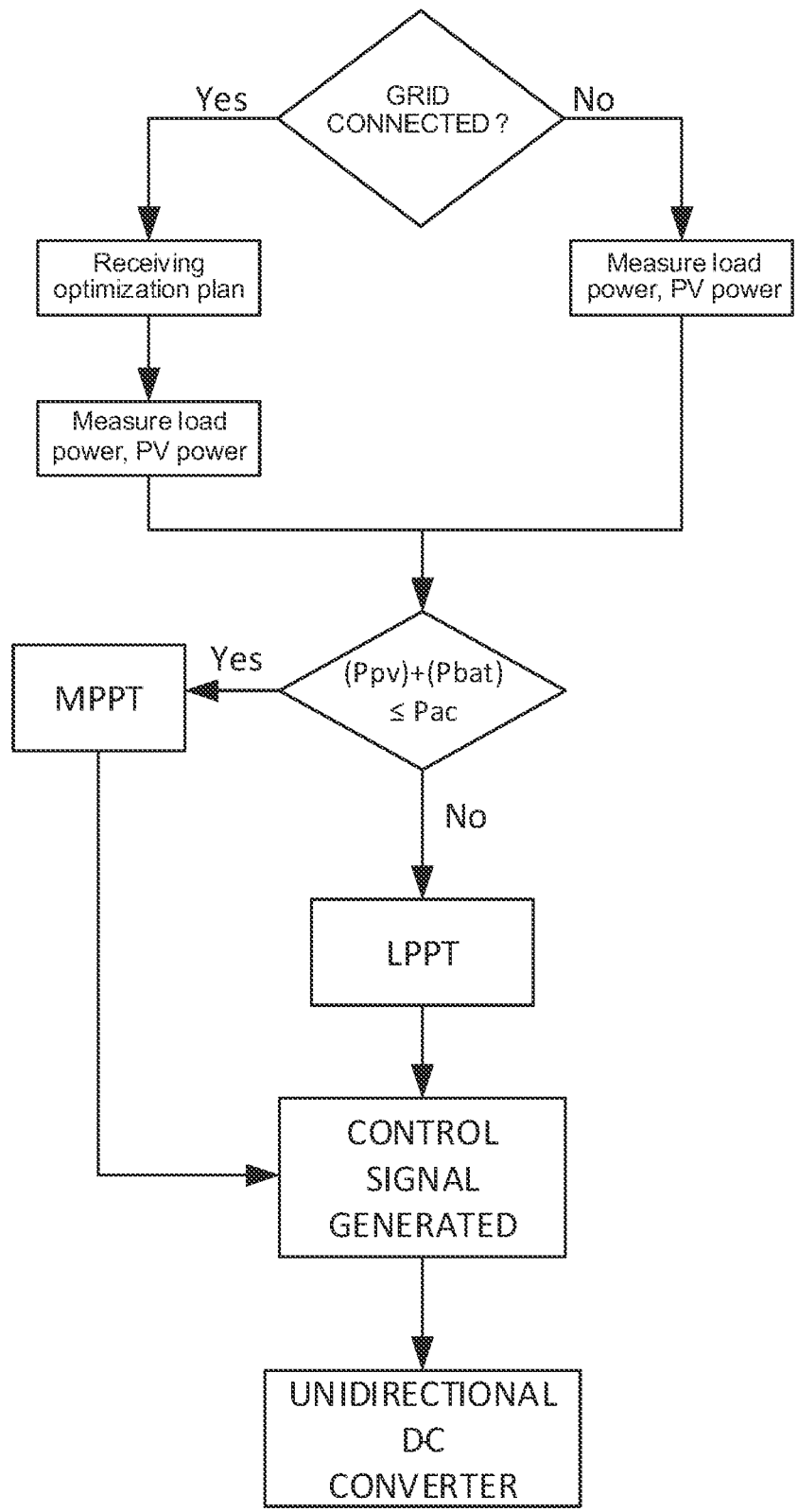
FIG. 21 shows the limited power point tracking.

For the dual active bridge 216 of FIG. 3, a model-based predictive dual-phase-shift control 1800 as shown in FIG. 18 maximizes the efficiency and provides better dynamic performance. The model-based Predictive Dual-Phase-Shift Control dual active bridge 216 greatly reduces the control error due to variable inductance. Compensation of the predicted current and feedback amplitude reduces the control error. The model-based predictive dual-phase-shift control scheme 1800 maximizes the efficiency and provides better dynamic performance of the dual active bridge 216. Conventional phase-shift control does provide power delivery, but with high power loss and current stress on hardware. The revised phase-shift control reduces the current stress, but the dynamic performance cannot be guaranteed. Model predictive control 1800 specifies the input-output relation of the voltages and currents, and selects the switch position to have the minimum cost function while also providing the preferred dynamic performance of circuit 216. The model-based predictive phase-shift control not only reduces the current stress of switches and improves efficiency, but also ensures the system has the desired dynamic response.

FIG. 18 shows the method 1800 for controlling the phase shift using the model-based predictive dual-phase-shift controller for the smart green power node 100 system is as follows:

First 1801, determine the dual active bridge model which specifies the input-output relationship of the currents and voltages by using multiple discrete time models.

Second 1802, obtain the discrete-time model from the continuous-time model to predict the system's future behavior.

Third 1803, construct the Lagrangian function to determine the optimized phase-shift ratio of two sides of the Full Bridge.

Fourth 1804, calculate the outer phase-shift ratio, Do, through the predicted circuit equations.

Fifth 1805, use another circuit equation to eliminate the leakage inductance error due to the current changing.

Sixth 1806, implement the phase-shift ratio Di and Do to gate control circuits for the node 100.

In the SGPN system 100, to cooperate with system level control and achieve the objectives of reducing energy consumption from grid 10 and maximizing the energy cost return, a Model-based Predictive Dual-Phase-shift Control 1800 (MPDPC) is used for the Dual-Active Bridge 216 stage. Three variables are optimized through the MPDPC: (1) Phase-shift ratio Di for each side of Full Bridge in Dual Active-Bridge (DAB); (2) Outer phase-shift ratio Do between the primary and secondary sides of DAB. (3) Those three variables are derived from the real time model of DAB. Not only the current stress of switching device is minimized, but also the transient response can be finished within one switching period to track the reference value from the system layer. The reference value from the system layer can be power command or voltage reference. To further reduce the power loss during power transmission, the power loss is also built in MPDPC.

Detailed Description of MPDPC:

As previously noted, there are multi-objectives in the SGPN system. The circuit level control is to maximize the power efficiency and better dynamic performance. Conventional phase-shift control is used to control power delivery but with high power loss and current stress. The revised phase-shift control 1800 is applied to reduce the current stress but as noted the dynamic performance cannot be guaranteed. Model Predictive Control 1800 is based on a circuit model by following KCL and KVL to specify the input-output relation of the voltages and currents, and select the switch position to have the minimum cost function and apply to circuit to achieve the preferred dynamic performance of circuit. However, how to combine high efficiency and good dynamic performance is becoming a challenge. Hence, the Model-based Predictive Phase-shift Control 1800 not only aims to reduce the current stress of the switches and improve efficiency, but also ensures the system has very good dynamic response.

To predict the current of the leakage inductance 1801, we must first determine the dual active bridge model that specifies the input-output relationship of the currents and voltages by using multiple discrete time models.

Figure 4:
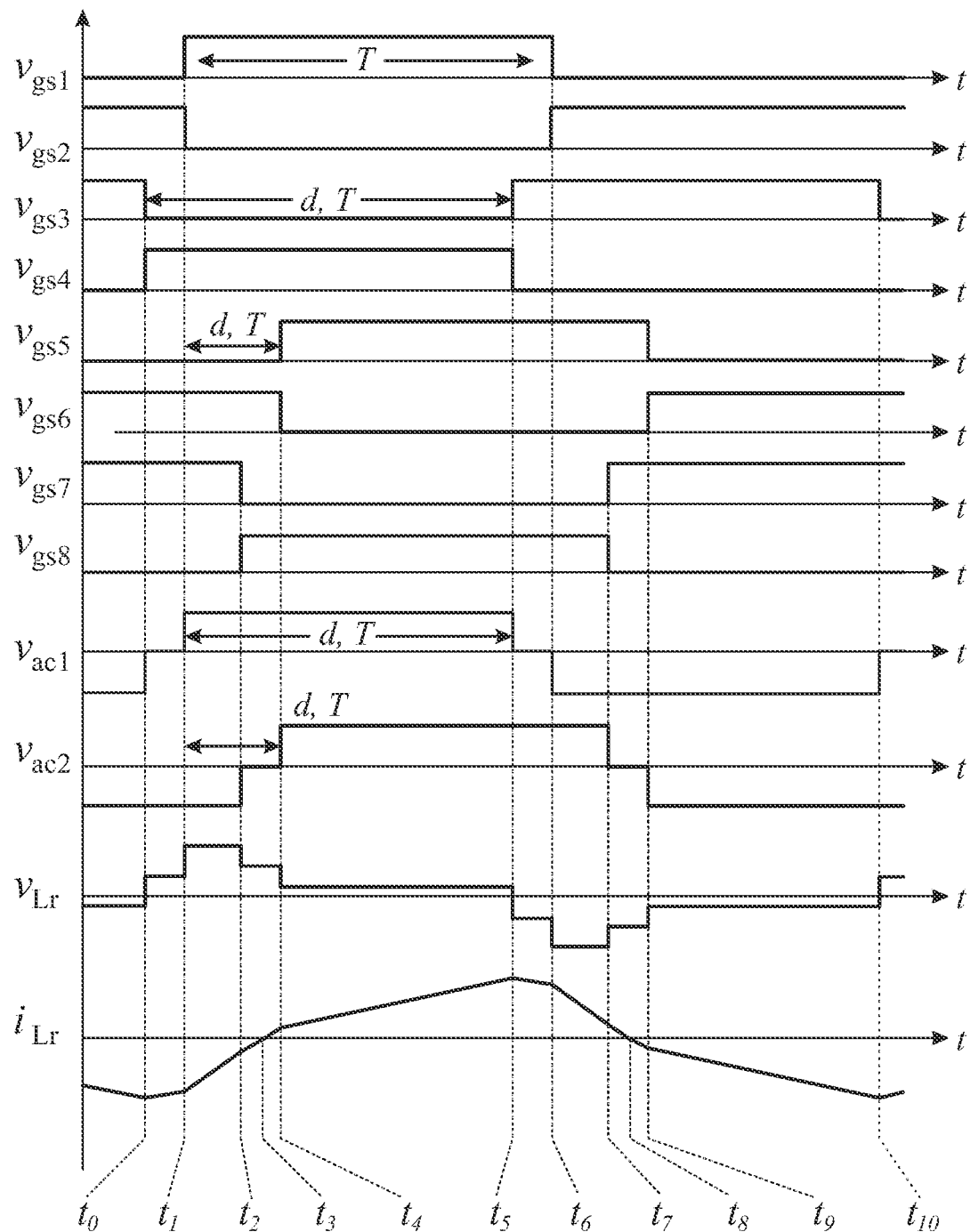
FIG. 4 is a graphic view of the operating modes in one switching cycle.
Figure 12:
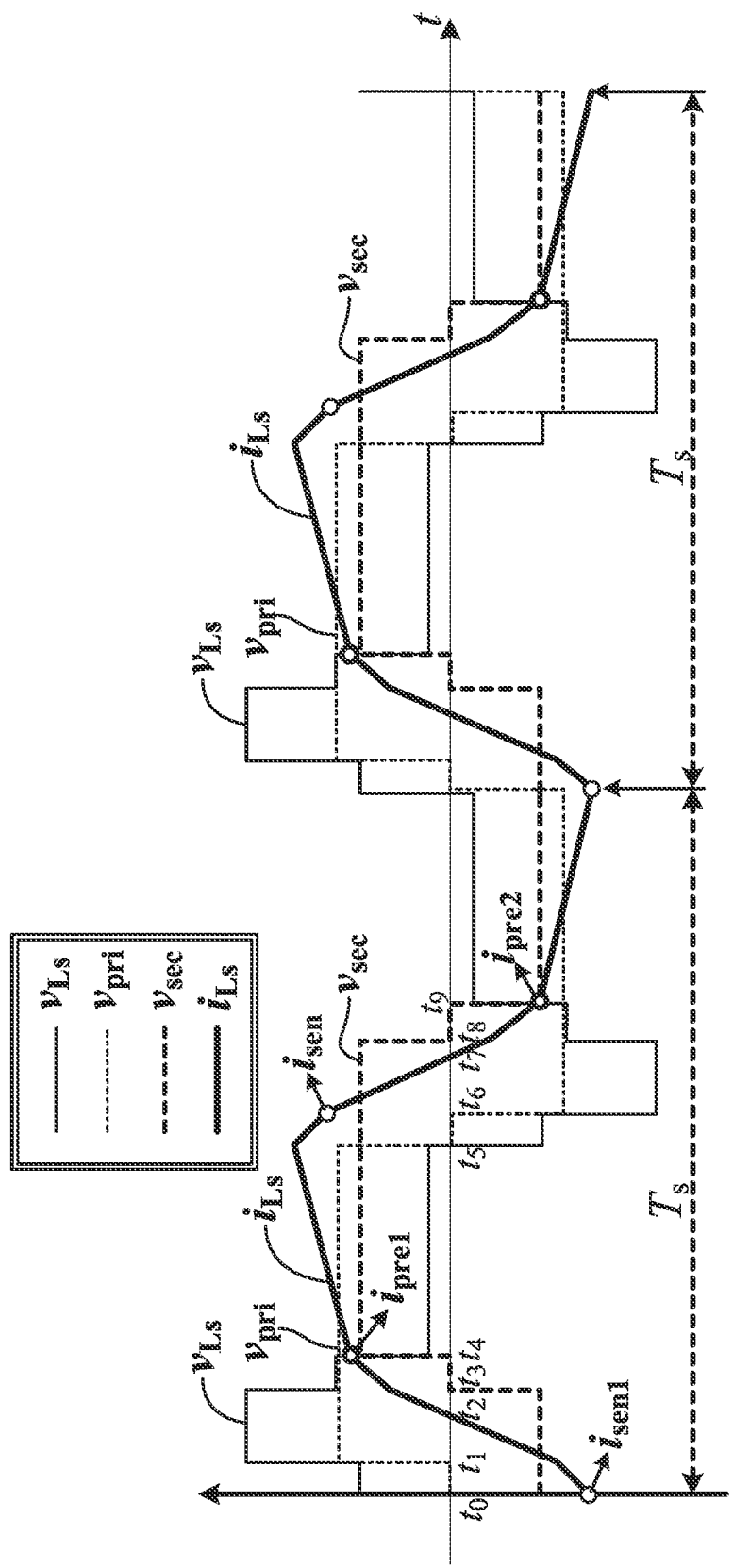
FIG. 12 shows operating modes in one switching cycle.

The circuit configuration of the Dual-Active Bridge is given in FIG. 3. The operating mode waveforms for a switching cycle are shown in FIG. 4 and the operating modes of the Dual-Active Bridge under dual-phase-shift control are shown in FIG. 12.

The equations for each operating mode are given as follows:

$$v_{pri}(t) = \begin{cases} 0, & t_0 \le t \le t_1 \\ V_1, & t_1 < t \le t_2 \\ V_1, & t_2 < t \le t_4 \\ V_1, & t_4 < t \le t_5 \\ 0, & t_5 < t \le t_6 \\ -V_1, & t_6 < t \le t_7 \\ -V_1, & t_7 < t \le t_9 \\ -V_1, & t_9 < t \le t_{10} \end{cases}$$

$$v_{sec}(t) = \begin{cases} -NV_2, & t_0 \le t \le t_1 \\ -NV_2, & t_1 < t \le t_2 \\ 0_2, & t_2 < t \le t_4 \\ NV_2, & t_4 < t \le t_5 \\ NV_2, & t_5 < t \le t_6 \\ NV_2, & t_6 < t \le t_7 \\ 0_2, & t_7 < t \le t_9 \\ -NV_2, & t_9 < t \le t_{10} \end{cases}$$

$$i_{Lr}(t) = \begin{cases} i_{Lr}(t_0) + \frac{v_{pri}(t_1) - v_{sec}(t_1)}{L_r}(t - t_0), & t_0 \le t \le t_1 \\ i_{Lr}(t_1) + \frac{v_{pri}(t_2) - v_{sec}(t_2)}{L_r}(t - t_1), & t_1 \le t \le t_2 \\ i_{Lr}(t_2) + \frac{v_{pri}(t_4) - v_{sec}(t_4)}{L_r}(t - t_2), & t_2 \le t \le t_4 \\ i_{Lr}(t_4) + \frac{v_{pri}(t_5) - v_{sec}(t_5)}{L_r}(t - t_4), & t_4 \le t \le t_5 \\ i_{Lr}(t_5) + \frac{v_{pri}(t_6) - v_{sec}(t_6)}{L_r}(t - t_5), & t_5 \le t \le t_6 \\ i_{Lr}(t_6) + \frac{v_{pri}(t_7) - v_{sec}(t_7)}{L_r}(t - t_6), & t_6 \le t \le t_7 \\ i_{Lr}(t_7) + \frac{v_{pri}(t_9) - v_{sec}(t_9)}{L_r}(t - t_7), & t_7 \le t \le t_9 \\ i_{Lr}(t_9) + \frac{v_{pri}(t_{10}) - v_{sec}(t_{10})}{L_r}(t - t_9), & t_9 \le t \le t_{10} \end{cases}$$

Second 1802, we must obtain the discrete-time model from the continuous-time model to predict the system's future behavior.

At time instances t4 and t9, the current of the leakage inductance iLr is predicted by Eqs. (4) and (5), respectively, iLr(t0) and iLr(t5) are the two current sensing points.

$$I_{pre1} = i_{Lr}(t_4) = \tag{4}$$
$$i_{Lr}(t_0) + \left(\frac{NV_2}{L_r}T_{hs} - \frac{V_1 + NV_2}{L_r}T_{hs} + \frac{V_1}{L_r}T_{hs}\right)D_i + \frac{V_1 + NV_2}{L_r}T_{hs}D_o$$

$$I_{pre2} = i_{Lr}(t_9) = \tag{5}$$
$$i_{Lr}(t_5) + \left(\frac{NV_2}{L_r}T_{hs} - \frac{V_1 + NV_2}{L_r}T_{hs} + \frac{V_1}{L_r}T_{hs}\right)D_i + \frac{V_1 + NV_2}{L_r}T_{hs}D_o$$

Figure 5:
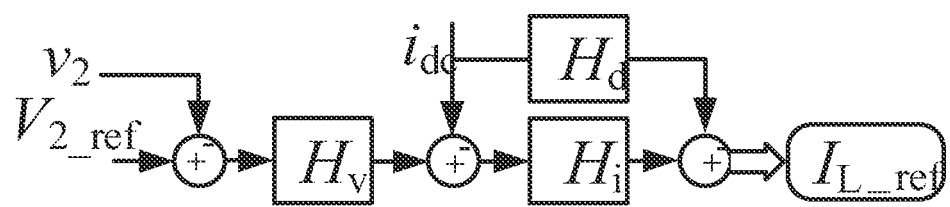
FIG. 5 is a schematic view of the inductor current controller.

The inductance current control diagram for the DAB is shown in FIG. 5, where idc is the feed forward signal. This approach results in better transient response performance.

Third 1803, we construct the Lagrangian function to determine the optimized phase-shift ratio of the two sides of the Full Bridge.

Through the current equations in each mode, the average transmission power and peak current of the leakage inductance are calculated in Eqs. (6) and (7), respectively. The objective of this calculation is to minimize the current stress in the switches. The Langrangian function is constructed as in Eq. (8).

$$P_{out} = \tag{6}$$
$$\begin{cases} \frac{NV_1V_2D_o(2D_i - D_o)}{4f_sL_r}, & D_o + D_i \le 100\%, D_o < D_i \\ \frac{NV_1V_2D_o(2D_i + 2D_o - 1 - 2D_o^2 - D_i^2)}{4f_sL_r}, & D_o + D_i > 100\%, D_o < D_i \end{cases}$$

$$i_{Lr\_MAX} = \frac{NV_2[(D_i - D_o)|1 - k| + D_o(1 - k)]}{4f_sL_r} \tag{7}$$

$$L(D_o, D_i, \lambda) = i_{LR\_MAX}(D_o, D_i) + \lambda[P_{out}(D_o, D_i) - P_{out}] \tag{8}$$

When the peak current is minimized, we have:

$$\begin{cases} \frac{\partial L}{\partial D_i} = \frac{\partial i_{Lr\_MAX}}{\partial D_i} + \lambda \frac{\partial P_{out}}{\partial D_i} = 0 \\ \frac{\partial L}{\partial D_o} = \frac{\partial i_{Lr\_MAX}}{\partial D_o} + \lambda \frac{\partial P_{out}}{\partial D_o} = 0 \\ \frac{\partial L}{\partial \lambda} = P_{out}(D_i + D_o) - P_{out} = 0 \end{cases} \tag{9}$$

Fourth 1804, we calculate the outer phase-shift ratio, Do, through the predicted circuit equations.

If $D_i$-$D_o$>100%, $D_o$ can be solved as:

$$D_o = \frac{\sqrt{\frac{P_{out}f_sL_r(k-3)(k+1)}{NV_1V_2} + \frac{(k^2 - 2k + 3)^2}{4} - \frac{(k-3)(k+1)(k-1)^2}{2}}}{k^2 - 2k + 3} \tag{10}$$

If $D_i$+$D_o$≤100%, $D_o$ can be solved as:

$$D_o = \frac{\sqrt{\frac{4P_{out}f_sL_r(k-1)}{N^2V_2^2k(k+3)}}}{k^2 - 2k + 3} \tag{11}$$

Fifth 1805, we use another circuit equation to eliminate the leakage inductance error due to the current changing.

Figure 6:
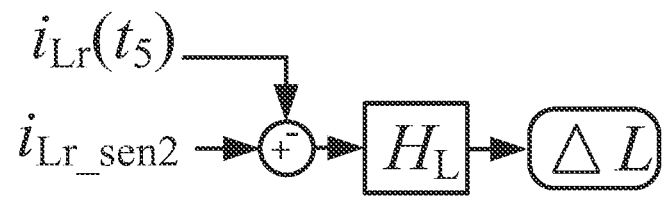
FIG. 6 is a schematic view of the leakage inductance compensation.

Due to the fact that the leakage inductance of the transformer is always changing due to the current, to modify the inductance in the predicted equations, the control block in FIG. 6 is designed to compensate for the inductance error of the transformer. The leakage compensation circuit equation will correspond to the transformer utilized in the design.

Sixth 1806, we implement the phase-shift ratio Di and Do to gate control circuits for the node 100.

Figure 7:
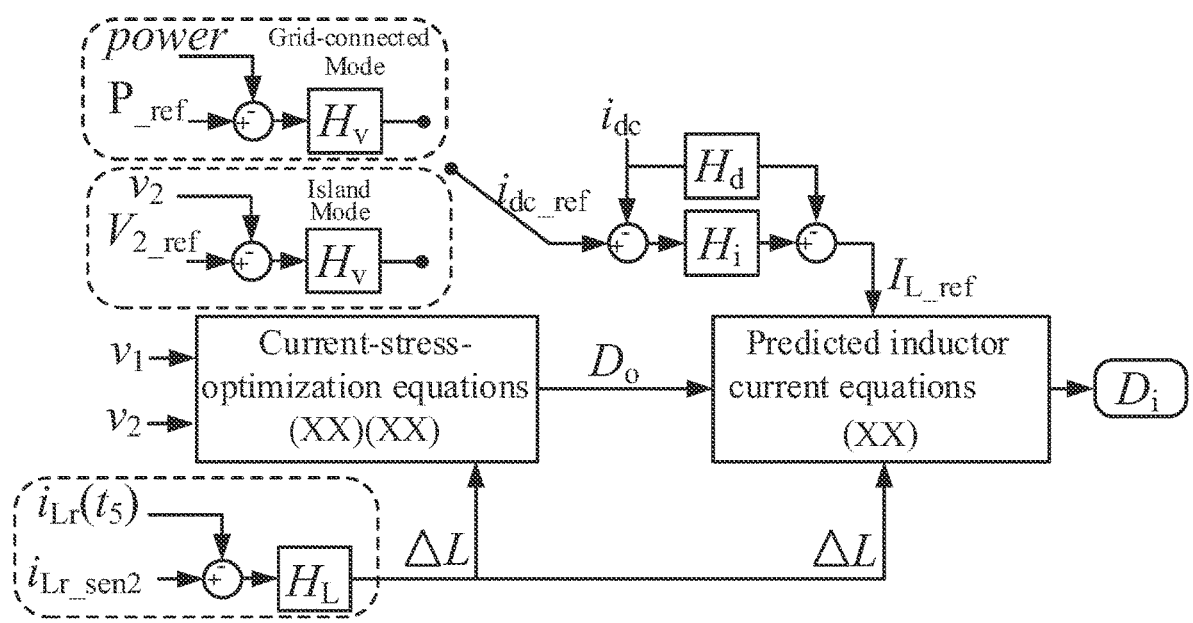
FIG. 7 is a block diagram of the overall model based predictive dual phase shift control.

The overall circuit level control is illustrated in FIG. 7. In the island mode, idc_ref is calculated by the voltage loop. When in grid-connected mode, idc_ref is calculated by the power loop. The power reference is determined by the system layer control.

Thus, we end up with FIG. 7 as the block diagram of Model-based Predictive Dual-Phase-shift Control 1800 for a Dual-Active Bridge stage.

2) Condition Monitoring and Layered, Energy-Predictive Control

Figure 8:
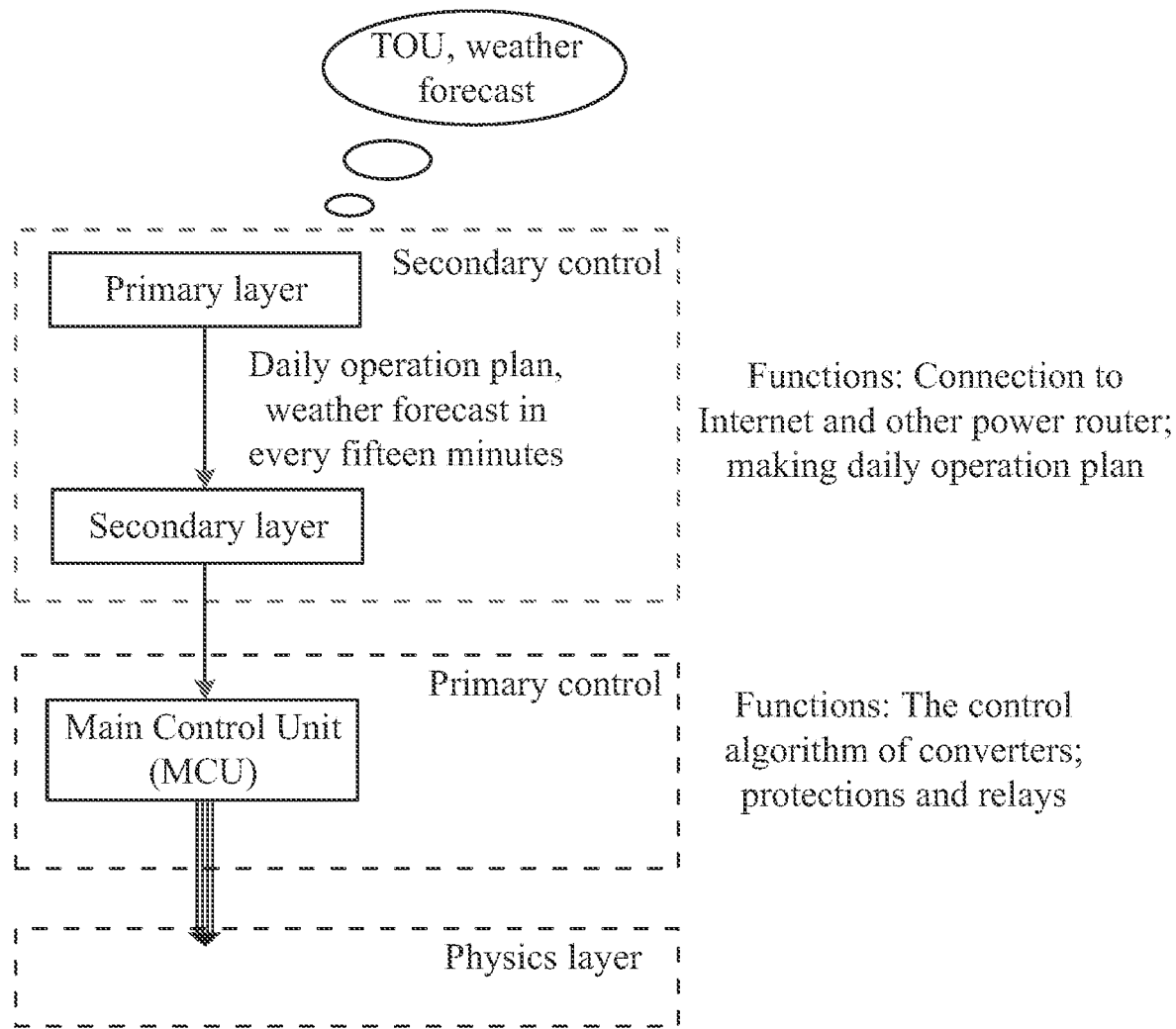
FIG. 8 is a schematic overview of layered, energy predictive control.

A general structure of the hierarchical control strategy is shown in FIG. 8. A hierarchical control strategy, including battery 32 condition monitoring and energy prediction, are presented. This control strategy operates the smart green power node 100 and controlled resources to minimize energy costs. Energy prediction includes both generated energy from solar panels 22 and consumed energy 10 at the residence. The condition of the battery 32 storage is monitored. The storage capacity of batteries 32 is diminished with time, rates of charge or discharge, amounts of energy stored within them, and excessive voltages. The health of batteries 32 represents this capacity and the conditions the battery 32 can safely operate within. The amount of energy stored in the batteries 32 and the revenue associated with its distribution to the grid must be balanced with the health of the batteries 32 and the cost of their replacement or maintenance. This hierarchical control strategy uses two layers of controls to create accurate and timely predictions; and optimizes battery 32 use in accord with battery 32 state of charge and state of health.

The energy predictive control 800 includes a primary control 820 that executes algorithms for the physical level 830 of the smart green power node 100 converters. The secondary control 810 gathers information from the internet such as weather predictions and time of use energy costs, creates an operation plan, and sends orders to the primary control 820. The secondary control 810 uses a primary layer 812 algorithm that generates a twenty-four hour operation plan for the power routing circuit 200 based on the time of use, historical use date based on day of the week, and weather forecast. The secondary layer 814 operates at an hourly level to generate operation plans for the next hour based on the primary layer 812 optimization results and solar illumination forecast in fifteen minute periods.

Figure 9:
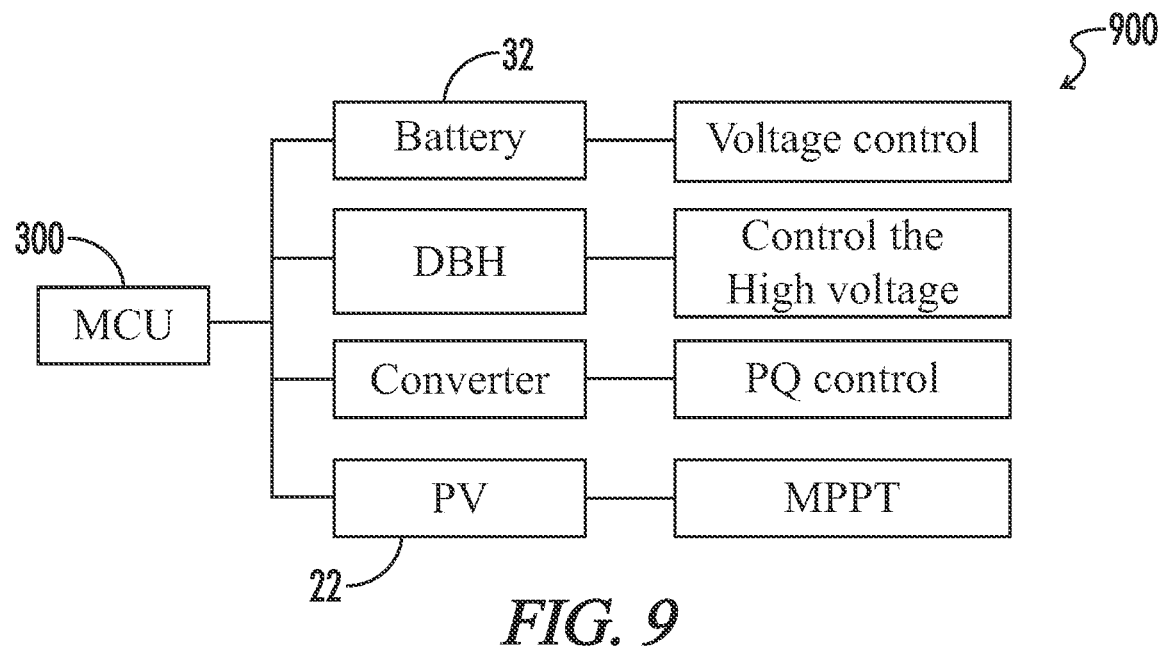
FIG. 9 shows control schemes for grid connected mode.
Figure 10:
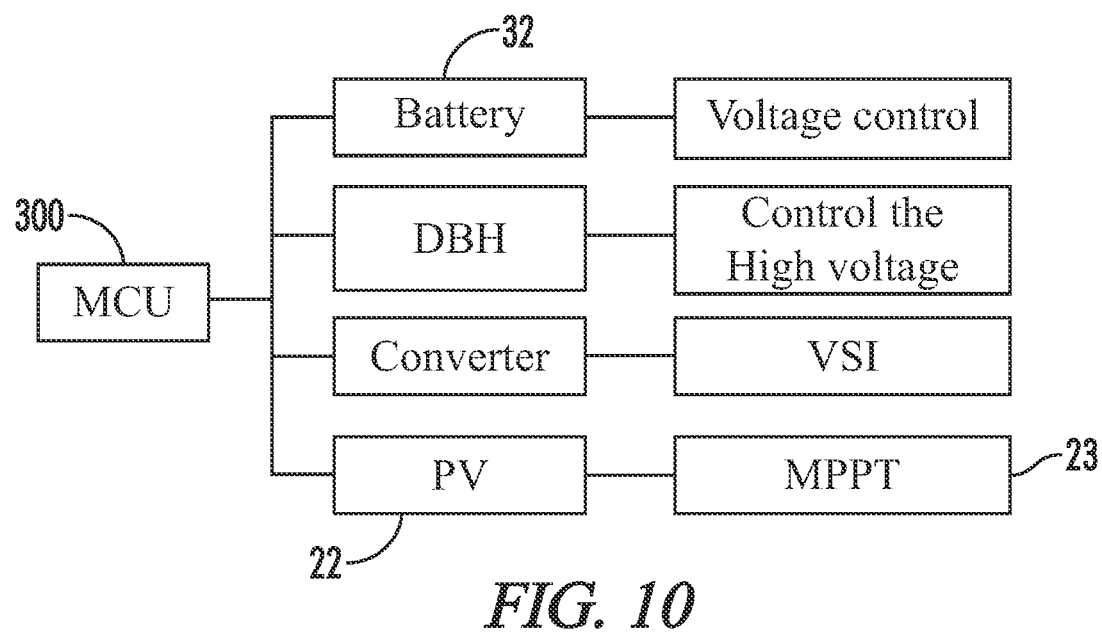
FIG. 10 shows control schemes for island connected mode.

The controls operate in either grid-connected mode shown in FIG. 9, or a grid-disconnected aka "islanded mode" shown in FIG. 10.

As shown in FIG. 9 the target of the grid-connected optimization algorithm 900 is to minimize the daily operation expense of the load 40. There are two ways to minimize operation expense: maximizing the photovoltaic panel 22 generation and leveraging the batteries 32 for energy storage.

The target of the islanded mode 1000 is to maintain the power balance in the system. Namely, this means managing available energy by 300 operating the battery 32 and photovoltaic panels 22 to meet the demands of the residential load 40. It is possible for photovoltaic power to exceed both the storage capacity of the batteries 32 and the load demands 40. In this case, the power from the photovoltaic panels 22 must be limited as through t limited power point tracking methods 23. Control of loads 40, including load shedding, may be used to balance power. The most important goals in islanded mode 1000 are to maximize the power supplying time and minimize the load 40 power shed.

A general structure of this hierarchical control strategy 800 is shown in FIGS. 8, 16, and 17 and detailed below. The control 800 could be realized through an MCU or microcomputer 300 such as a Raspberry Pi controller. Its secondary control functions 810 include getting information from the Internet, making the operational energy management plan and sending orders to the primary control 820. The primary control can also be realized through a microcontroller 300 but here we used a Digital Signal Processor (DSP) and Advanced RISC machine (ARM). Its functions are the control algorithm of converters in the power router at the physical layer 830.

As noted, one function of the secondary control 810 is to make the operational plan for the system 100 based on the optimization results. The microcomputer 300 gets information from the Internet and the system 100. The information includes the predicted solar illumination, time of use electricity price, historical day-of-week usage, the battery state of charge, and power flow in the power router.

A. Grid-Connected Mode

The target of the grid-connected optimization algorithm 800 is to minimize the daily operational expense. Therefore, there are two ways to minimize operation expense: maximizing the PV 22 generation and daily cycling of battery 32. Considering the fluctuation of solar illumination, the optimization has two layers. The primary layer 812 is at a single day level making a twenty-four hour operational plan for the power router 100 based on the time of use (TOU) electricity price, historical usage data and weather forecast. The secondary layer 814 is at an hourly level making the operational plan for the next hour based on the primary layer optimization result and solar illumination forecast in fifteen minute periods.

i. The Primary Layer

For Grid-connected mode, the Primary layer's objective function of the daily operation plan is calculated as follows:

$$M = \min\left(\sum_{t=1}^{24} P_{batt}(t) \times TOU - \frac{2}{C_{30\%}} Pr\right) \tag{12}$$

In (12), $P_{batt}(t)$ is the output power of the battery. TOU is the time of use electricity price. C30% is the cycle life of the battery when the depth of discharge (DoD) of every cycle is 30%. Generally, it will be provided by the battery manufacturer.

The constraint conditions include:

$$SoH \times P_{batt\_min} \leq P_{batt}(t) \leq SoH \times P_{batt\_max} \tag{13}$$

$$SoH \times |P_{batt}(t)| \leq P_{dc\_max} - P_{PV} \tag{14}$$

$$60 \leq SOC \leq 90 \tag{15}$$

$$SOC(1) = SOC(24) = 75 \tag{16}$$

SoH is defined as the ratio of actual battery capacity and maximum battery capacity as shown in (17).

$$SoH = \frac{C_{batt}}{C_{max}} \tag{17}$$

Figure 14:
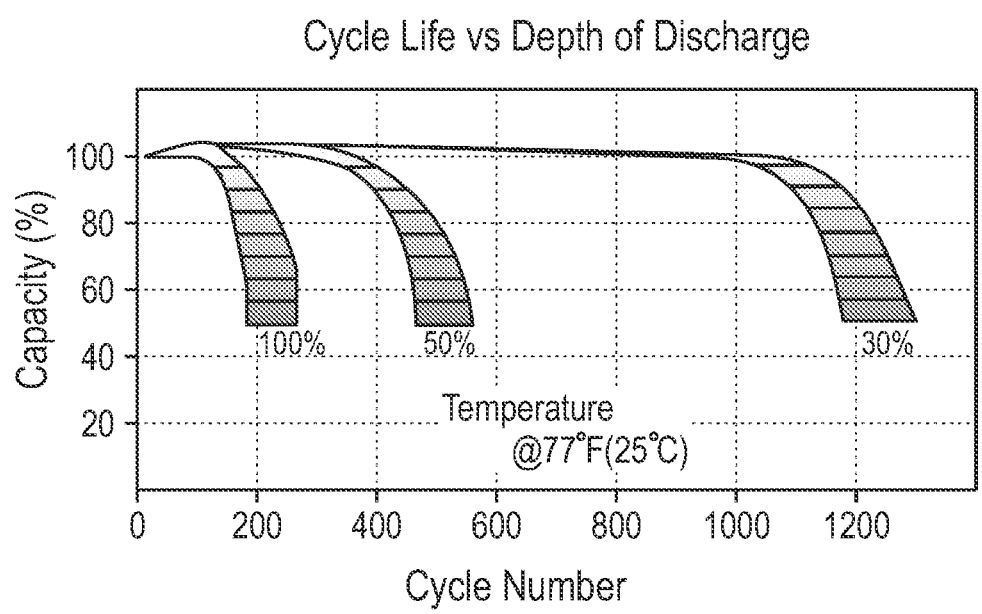
FIG. 14 shows a typical battery cycle life vs. DoD curve.

It is used to quantify the health condition of battery. Generally, there are two ways to measure the SoH. It could be derived with DoD and life cycle of the battery. FIG. 14 is a typical curve of battery cycle life and DoD. Another way is to use a coulometer to measure the capacity of the battery Cbatt.

Eq. (13) is the battery output power. $P_{batt\_min}$ is the maximum battery 32 charging power. Eq. (14) is the power balance, considering the PV generation. $P_{dc\_max}$ is the maximum power delivered by the isolated bidirectional DC/DC converter. $P_{PV}$ is the average PV generation power in one hour. In order to prevent deep discharge that would damage the battery, the battery state of charge (SOC) limitation should be set as shown in Eq. (15). $P_{batt\_max}$ is the maximum battery discharging power. Eq. (16) is the daily SOC balance. The SOC at the end the one day should be equal to the SOC at the beginning of the next day. The calculation of real time SOC is shown in Eq. (18)

$$SOC(t) = SOC(1) + \sum_{i=1}^{t} i(i) \times V_b(t) \times K \qquad (18)$$

K is a factor determined by the battery capacity $C_{batt}$ and rated voltage $V_{batt}$. It could be derived as shown in Eq. (19).

$$K = \frac{3.6}{C_{batt} \times V_{batt}} \qquad (19)$$

The optimization could be realized through a genetic algorithm (GA) or particle swarm optimization (PSO) algorithm. The optimization results are the output power of the battery at every hour.

ii. The Secondary Layer

The secondary layer 814 considers the fluctuation in one-hour periods. It aims at achieving power balance over one hour. The main control unit 300 (MCU) obtains the solar illumination and temperature for the next four quarter hours.

Because the TOU in one hour generally remains constant, the total electricity expense during this hour is constant. The main duty of the secondary layer 814 is to minimize the fluctuation of battery 32 output power. The objective function of the hourly operational plan is as follows:

$$M = \min \sum_{t=1}^{4} (|P'_{batt}(t) - P_{batt}|) \qquad (20)$$

In Eq. (20) $P_{batt}$ is the average power in this hour. It is the result of the Primary layer. $P_{batt}'(t)$ is the battery output power every quarter hour. The constraint conditions include:

$$P_{batt\_min} \le P_{batt}(t) \le P_{batt\_max} \qquad (21)$$

$$|P_{batt}(t)| \le P_{dc\_max} - P_{PV} \qquad (22)$$

$$\frac{\sum_{t=1}^{4} P'_{batt}(t)}{4} = P_{batt} \qquad (23)$$

Eq. (21) is the limitation of battery output power. Eq. (22) is the limitation of PV. Eq. (23) conveys that the average power in one hour should be equal to the daily operation plan.

B. Islanded Mode

In islanded mode, the control target is to maintain the power balance in the system.

In islanded mode, the PV power should be limited when more power is generated than what is consumed by the loads and the battery. Thus, the Perturbation &(Observation (P&O) based Limited Power Point Tracking (LPPT) control algorithm is utilized.

Figure 15:
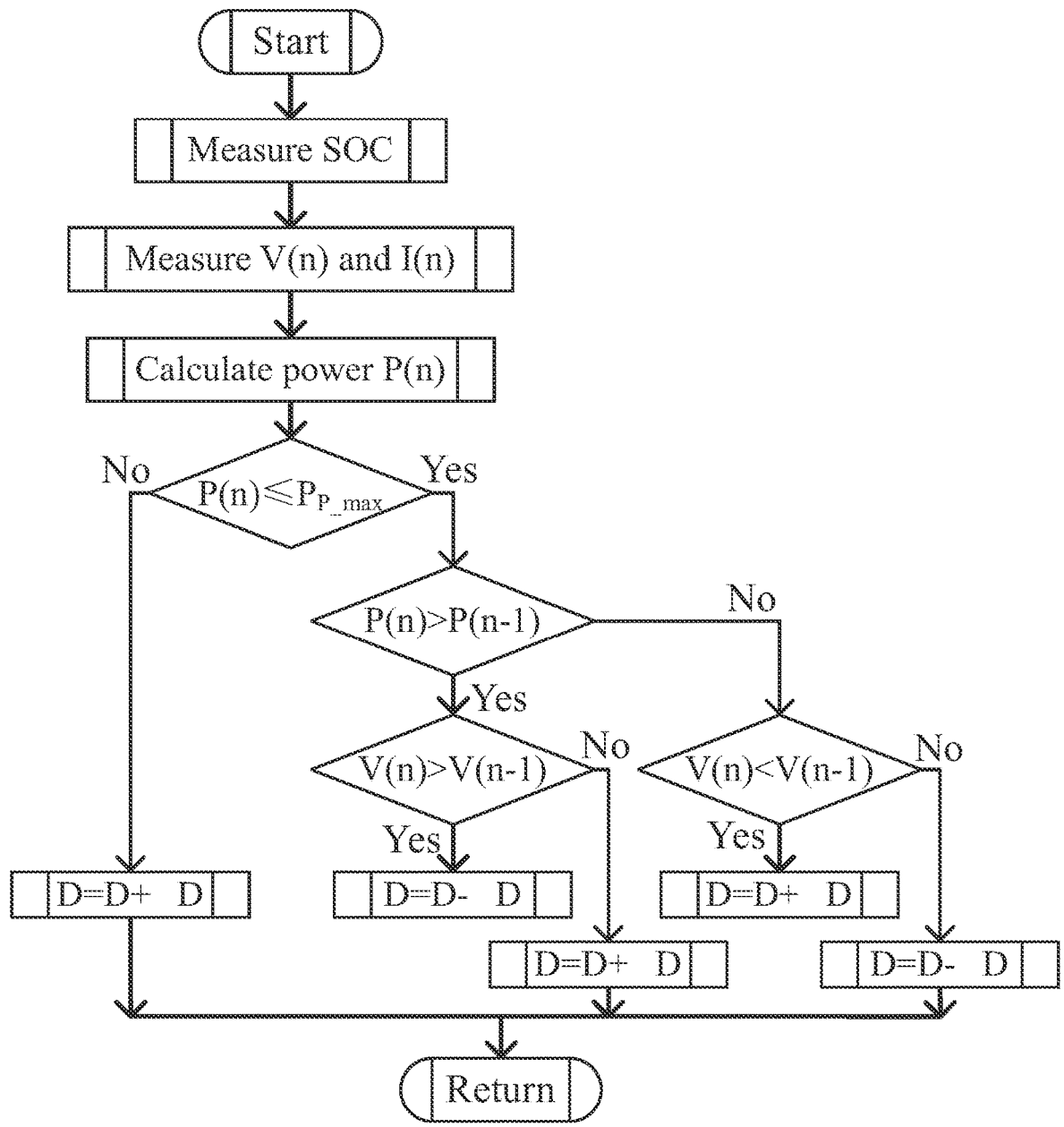
FIG. 15 shows a limited power point tracking limitation algorithm.

The basic working principal is as shown in FIG. 15.

In FIG. 15, the maximum power of the solar cell $P_{P\_max}$ could be expressed as in Eq. (24)

$$P_{P\_max} = \begin{cases} P_{load} - P_{B\_max}; SOC < 90 \\ P_{Load}; SOC \ge 90 \end{cases} \qquad (24)$$

In Eq. (24), $P_{Load}$ is the load power. $P_{P\_max}$ is the maximum charging power of the battery.

3) Energy Market Controls

Coordinated Grid-Edge Power Control

Figure 11:
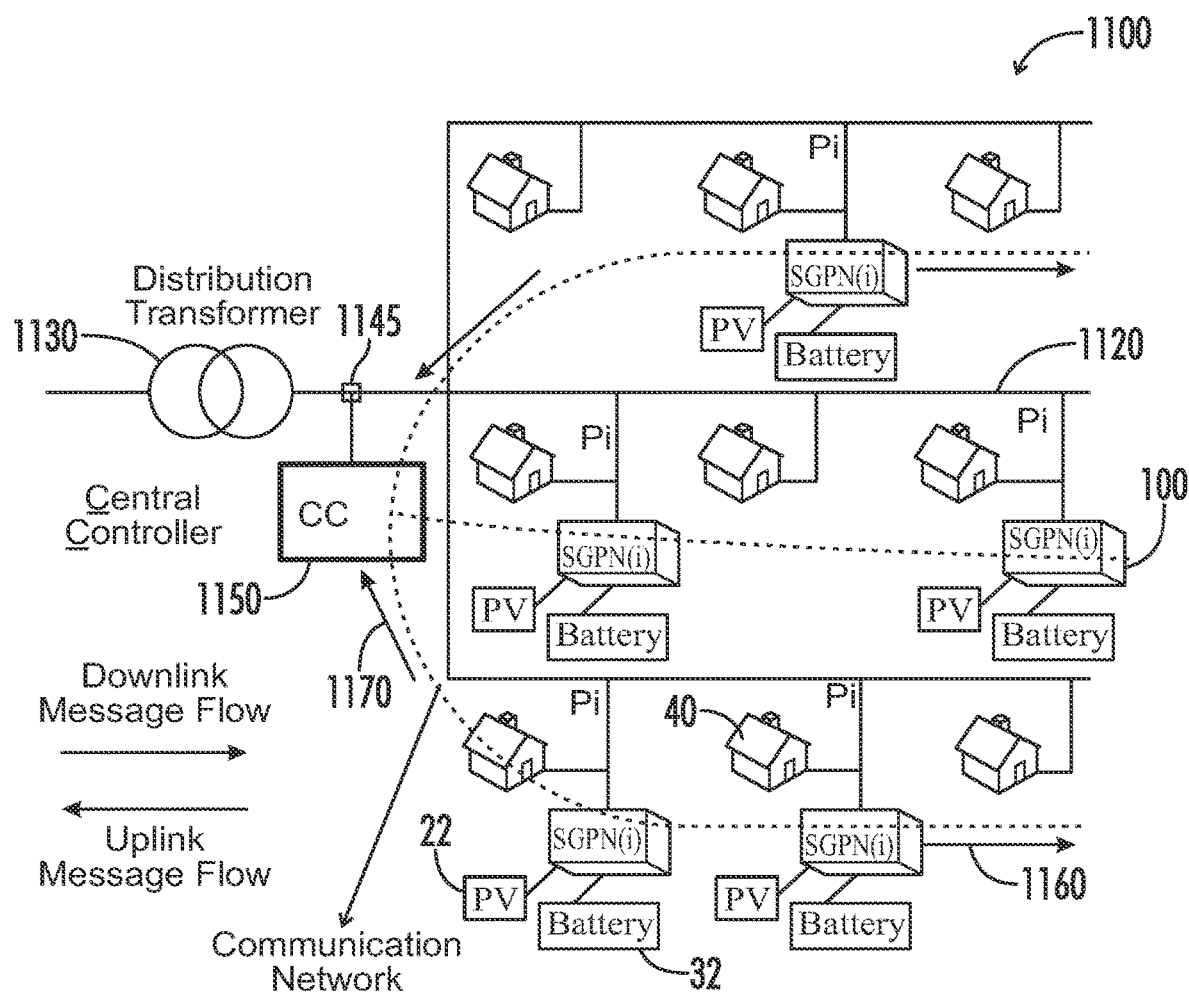
FIG. 11 shows a schematic view of the communication network.
Figure 13:
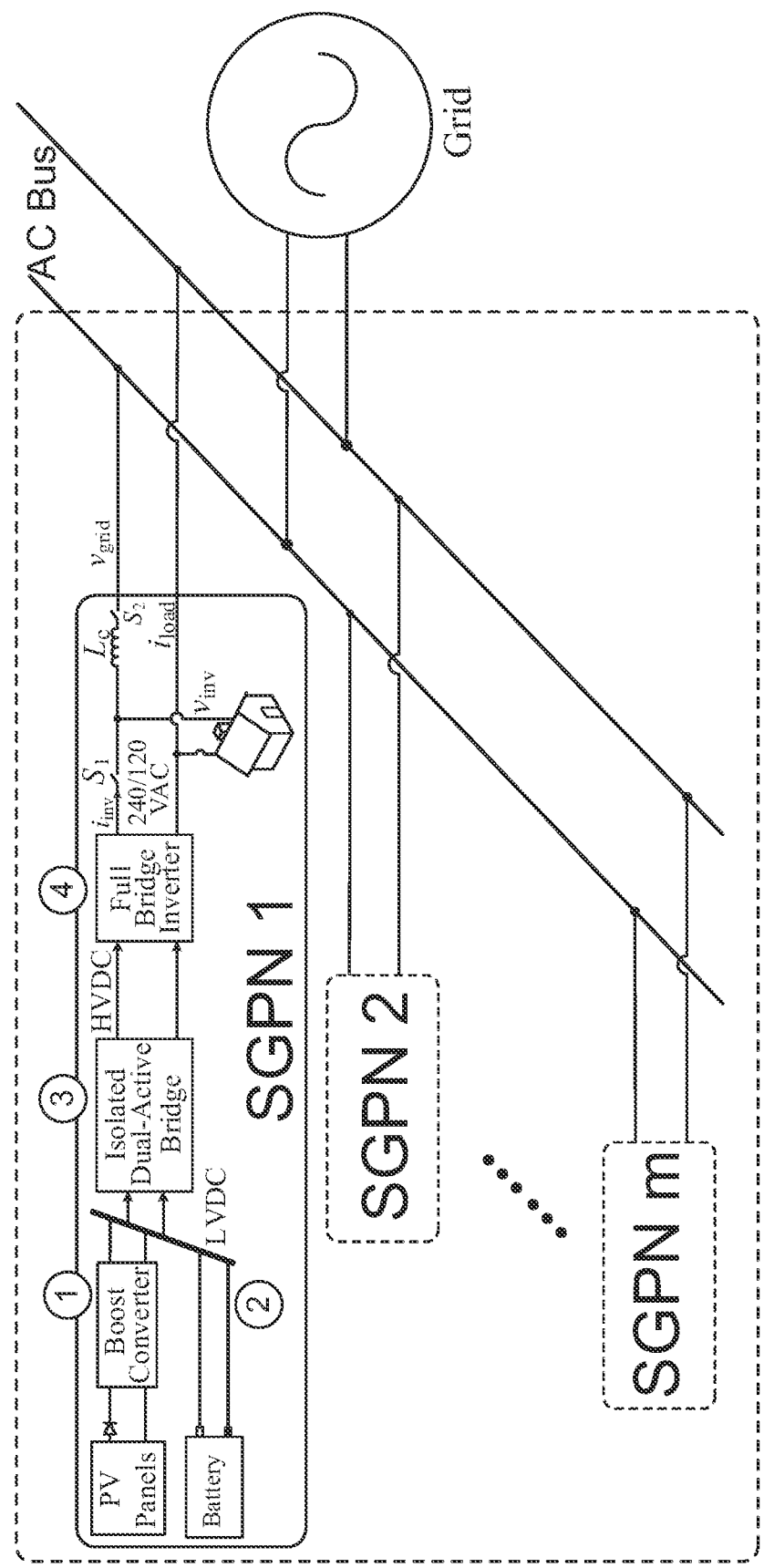
FIG. 13 shows a system level grid connection.

As an overview, FIGS. 11 and 13 show how most grid 10 infrastructure is designed to distribute power from a centralized generator to many loads 40. Generation and distribution of power at the edge of the grid 10, at the conventional site of consumption, presents new issues. The use of many smart green power node 100 devices is an example of a collection of grid-edge devices. The issues requiring attention are: 1) over-voltage of the grid 10, 2) excessive back-feeding of power into the grid 10, 3) balanced power management for the smart green power node 100 devices working together, 4) fair compensation for the operation of these smart green power node 100 devices as a collective, and 5) the communication and coordination of these smart green power node 100 devices.

Control of this community of smart green power node 100 devices maximizes total photovoltaic panel 22 power within the constraints of voltage range, grid back-feeding limits, and ensured fair demands of the smart green power node 100 devices.

FIGS. 11 and 13 illustrates a configuration of a community 1100 of smart green power node 100 devices. The community 1100 consists of different houses 40 connected at several points on secondary feeders 1120, and connecting to the grid 1110 through one step-up/step-down distribution transformer 1130.

An arbitrary portion of residences use a smart green power node 100. The community of residences 40 with and without smart green power node 100 devices are connected to the grid 10 through secondary feeders 1120 and a distribution transformer 1130. Power flow may be between residences 40, from the grid 10 into the residences 40, or from the residences 40 into the grid 10 for reverse power flow operation. The power sent to the grid 10 comes from on-site resources, here, photovoltaic 22 and batteries 32. Usually output power of a photovoltaic panel 22 system is controlled by a maximum power point tracking mechanism in the inverter. Maximum power point tracking may cause over-voltage, if not controlled pro-actively. As a result, multiple photovoltaic system 22 may make contributions to over-voltage at the same point of the secondary feeders 1120. If the power points of these photovoltaic systems 22 are determined in a coordinated way, then over-voltage will occur with a much lower probability. Reverse power flow operation is subject to two constraints: 1) the input voltage level of step-up operation must be controlled strictly within ratings to ensure a safe voltage level at the output side; 2) the reverse power flow needs to be controlled so that it does not damage the distribution transformer 1330. As a result, a threshold must be set for the reverse power flow, and the voltage levels at both sides of the transformer 1130 must be maintained within ratings.

Utilities compensate users for power supplied to the grid 10. In this community of smart green power node 100 devices, coordination is required to fairly share both the power supplied to the grid 10 and compensation from the utility to the suppliers. The total surplus power that can be supported by the grid is limited due to constraints of voltage and reverse power flow. The fair allocation strategy is determined based on the power rating of on-site resources for each smart green power node 100 device. The share of surplus power is proportional to the size of the generation power from each smart green power node 100 device. If a smart green power node 100 device and on-site resources have a larger generation capacity, it is allocated with a larger share of surplus power. This strategy provides a user with a larger investment in capacity with a proportionally higher revenue.

The coordination power control consists of a central controller 1150 to coordinate the nodes 100 and the corresponding power points of all the photovoltaic systems 22. It is co-located with the transformer where a smart meter 1145 is added to work together with the central controller 1150. This central controller 1150 needs to communicate with all smart green power node 100 devices. A simple communication pathway is implemented either through the secondary feeders 1120 or an alternative system such as a wired or wireless internet protocol. Through the downlink message flow 1160, the central controller 1150 announces the power point to each smart green power node 100 device respective to the fair weight. The uplink message flow 1170 reports the status of each smart green power node 100 device. Through the communication, the smart green power node 100 device sends status information such as the voltage and power of a user which can be measured by residence level smart meters to the central controller 1150. The central controller 1150 determines the power point of each photovoltaic system 22 and then sends such information back. Once the smart green power node 100 receives a power point, it executes a power point tracking algorithm to set the output power.

For layered energy prediction control, in the second layer 814, the Maximum Power Point Tracking (MPPT) is extended to Coordinated Grid-Edge Power control 1150, when considering an ensemble of SGPN devices 100 in the community. Coordinated grid-edge power control 1150 involves the set of optimization algorithms to prevent overvoltage and excessive back-feeding power into the electric power grid.

Coordinated grid-edge power control is formulated as an optimization problem that maximizes total output power of PV systems subject to the constraints of voltage range, reverse power limit, and fairness. Considering a community 1100 populated along a secondary distribution feeder 1120 after the distribution transformer 1130, a number of users distributed at different locations are connected to the grid through SGPN devices 100 at different connection points. In such a community, the power now is bidirectional. The bidirectional function allows the users to use the power from the grid and send power to the grid from on-site resources (PV and batteries). Sending power to the grid from on-site resources is called "reverse power flow operation".

Once the SGPN 100 receives a power point, it executes a power point tracking algorithm to track the output power, and the same power tracking algorithm as that in MPPT can be employed. The difference is that due to the small power transfer and the multiple points of calculation, the computation is much faster. Since the power point is known to the tracking algorithm, the tracking process converges much faster than the entire process of MPPT. For the SGPN 100 devices in the community, the central controller 1150 and the SGPN 100 devices are connected via a wireless network. The delay associated with the communication is critical to the coordination of power control, and, for that reason. WiFi or Zigbee are considered to minimize the communication delay. A two-layer hierarchical wireless network is recommended.

The optimal algorithm formulation for the coordinated grid-edge power control is as follows: the set of users with SGPN 100 is $$N_1=\{1,\ldots,n\},$$

and the set of users without SGPN along the feeder are indexed by the set of $$N_2=\{n+1,\ldots,m\}.$$

All connection points in the secondary feeder are $$N=N_1+N_2=\{1,\ldots,m\}.$$

The admittance between the connection points, i and j are denoted by $y_{ij}$, the admittance matrix of the entire distribution feeder $$Y=[y_{ij}]i,j\in N.$$

Let V be the voltage vector of all the connection points, where $$V_i=|V_i|<\theta_i,$$

and $\theta_i$ is the phase angle. The complex power is $$S_i=P_i+jQ_i, S_i=P_{Gi}-P_{Li}+j(Q_{Gi}-Q_{Li}).$$

where $P_{Gi}$ and $Q_{Gi}$ are the active and reactive powers from on-site resources, and $P_{Li}$ and $Q_{Li}$ are the active and reactive powers for the loads in the houses. When $P_i>0$, the $SGPN_{(i)}$ is injecting power to the grid. When $P_i<0$, the power is flowing from the grid to the loads, and part of it is being used to charge the batteries on-site through the $SGPN_{(i)}$ device.

When the output power of all PV 22 systems is maximized, the power pulled from the grid 10 is minimized. The objective of the optimization problem is to determine the power points of all PV 22 systems such that the power from the grid 10 is minimized. The objective function: $_{\{PG\}}{}^{min}P_O$, where $P_O$ is the power pulled from the grid and $P_G$ is the vector of powers generated by the n SGPN 100 devices in the community.

Moreover, the objective function needs to consider constraints of voltage, reverse power flow and fairness. For the voltage constraint, to ensure the proper operation of the overall community 1100 system, voltages at all connecting points of all users need to be maintained within rating. Given the voltage rating [$V_{min}$, $P_{max}$], the voltage at each connection point is constrained as $$V_{min}+\Delta_V{}^{lb}\leq|V_i|\leq V_{max}-\Delta_V{}^{ub}$$

where $\Delta_V{}^{lb}$ and $\Delta_V{}^{ub}$ are small values to keep $|V_i|$ from actually reaching the lower limit $V_{min}$ and the upper limit $V_{max}$.

For the reverse power flow control constraint, there are two purposes, one is to prevent the step-down transformer 1150 from being overloaded. The other is to provide a flexible fine-tuning mechanism for the grid company to control the amount of power flow from distributed generators (PV systems 22 and battery banks 32). The constraints can be applied to both active and reactive power. The following constraint is the active power is $P_O \geq P_O^{lb}$, where $P_O^{lb}$ the lower bound for the power flowing from the grid. To protect the transformer, $P_O^{lb}$ must be set to a value much smaller than the power rating of the transformer $P_O$.

For the fairness constraint, the surplus power that can be generated by the SGPN device 100 determines the revenue for the customer's on-site resources. However, the total surplus power that can be supported by the grid 10 is limited due to constraints of voltage and reverse power flow. Thus, the surplus power must be shared by different SGPN devices 100 in a fair way. The fair allocation strategy is determined based on the power rating of on-site resources for each SGPN device as an example. The share of surplus power is proportional to the size of the generation power from each SGPN device $$P_i = k_i c.$$

where $k_i$ is the size ratio of i-th SGPN generation capacity, and c is total surplus power. Thus, if i-th SGPN has a larger generation capacity, it is allocated with a larger share of surplus power. This strategy is reasonable, because a user with a larger investment potentially receives a higher revenue. Suppose a user's load is $P_{Li}$, the maximum output power of the i-th SGPN device is $P_{Gi}^{max}$, then the surplus power allocated to this user is limited by $P_{Gi}^{max} - P_{Li}$. Thus, the fairness constraint is $$P_i = \min\{(P_{Gi}^{max} - P_{Li}), k_i c\}, c \geq 0.$$

4) Cybersecurity

A further improvement is the cybersecure smart green power node 100 which is designed around cybersecurity. This security protects data and resources on three different levels: network and external communication, internal communication, and system operation.

i. Network and External Communication

Network traffic from the cybersecure smart green power node 100, other devices, and a utility provider uses a robust set of protocols such as Distributed Network Protocol 3. This set of communication protocols is commonly used by supervisory control and data acquisition systems, Remote Terminal Units. and Intelligent Electronic Devices. It provides a reliable means of transmitting data, but security is not provided within this set of protocols. The cybersecure smart green power node 100 encrypts messages and commands that are then communicated using distributed Network Protocol 3. There cybersecure smart green power node 100 therefore provides security while using distributed Network Protocol 3.

Security features are also built into the communication network created by the cybersecure smart green power node 100. Authorized peers are listed on an internal whitelist. This whitelist is installed on the firmware, and might be updated later by an authorized party. All connections require two-way authentication. Identity can also be verified by a blockchain within a network of cybersecure smart green power node 100. The network created by various cybersecure smart green power nodes 100 is segmented. This segmentation minimizes damage caused by a breach of information. The segmentation also lowers the overhead of traffic within a segment.

A security module run by the processor 300 inside the cybersecure smart green power node 100 provides many security features. The features relevant to network and external communication are reporting, diagnostics, forensics, command parsing, and authentication. These are features possibly used by a supervisory control and data acquisition systems system to have visibility and control of a cybersecure smart green power node 100. This security module is able to operate during many conditions where the remainder of the cybersecure smart green power node 100 is shutdown or offline. The security module can report the status of the cybersecure smart green power node 100, data collected, the status of various internal subsystems, and network information. The security module is able to run diagnostics on firmware, power electronics, and controls. A log of data can be reported to aid in forensic analysis of system faults, attacks, or other events. The security module can analyze commands sent to the cybersecure smart green power node 100, and filter erroneous or malicious commands. Finally, the cybersecure smart green power node 100, via the security module, is able to process network blockchains, even if other submodules are shutdown or offline.

ii. Internal Communication

All internal, digital signals are encrypted. All submodules have unique identifiers, and require authentication before operation. Aside from the initial handshake, no digital communication occurs unless both the sender and receiver are authenticated. After this authentication, all communication that is susceptible to probing or side-channel attacks is encrypted.

iii. System Operation

The submodules—the various controllers and converters—are authenticated independently prior to operation. This independent authentication is done by the security module. The security module checks the firmware integrity of the submodules. The identity of the submodules can be verified by the security module and be verified by a blockchain with network peers. If a submodule tails authentication, firmware integrity checks, or diagnostics, it can be locked out and prevented from operation. The remainder of the cybersecure smart green power node 100 can continue operation, assuming the submodule is not necessary.

Alternative Module Overview

DC-DC Converter

Dc-dc converters are used to control a) unidirectional power flow from the photovoltaic (PV) panels to the low voltage bus, b) bidirectional power flow between the batteries and the low voltage bus, and c) bidirectional power flow between the low voltage bus and the high voltage bus.

Isolated Bidirectional DC-DC Converter

The dc-dc converter that controls bidirectional power flow between the low voltage bus and the high voltage bus is an isolated bidirectional dc-dc converter (IBDC). The IBDC should use a topology that employs phase-shift control, such as dual active bridge.

DC-AC Converter

A dc-ac converter is used to control power flow between the high voltage bus and the grid.

Energy Storage

Various devices, such as a battery bank, can be used as energy storage. The energy storage receives and discharges its power onto the low voltage dc bus of the CSPR through a dc-dc converter. Grid power and PV power can be stored in the energy storage. The usable life of this storage may be extended if the storage is charged or discharged at certain rates, and held between certain states of charge. If batteries are used for the energy storage, battery health monitoring may be employed to control the energy storage. In case of a loss of grid power, the energy storage may be discharged to provide an uninterruptible power supply for the ac load. In case of valley filling of grid power, the batteries may be charged to increase the load of the grid.

Power Router

A system of dc-dc converters, a dc-ac converter, and relays are used to move power between PV panels, energy storage, the grid, and loads. PV panels deliver power to the low voltage dc bus through a unidirectional dc-dc converter. This unidirectional dc-dc converter uses Maximum Power Point Tracking or Limited Power Point Tracking to control power flow. Energy storage stores or discharges power to and from the low voltage bus through a bidirectional dc-dc converter. This bidirectional dc-dc converter uses Predictive Economic Optimization or emergency modes of operation to control power flow. The high voltage dc bus or low voltage dc bus could provide an extension interface to a dc link, such as dc microgrid or other dc application. A dc-ac converter controls power flow between the high voltage bus and an external distribution board. Relays allow or prevent power flow between the load (or loads) and the distribution board. Relays also allow or prevent power flow between the grid and the distribution board.

Concurrent Hardware Architecture for Controllers

Hardware control and any other operation are processed by concurrent, not sequential, computation. This can be accomplished by a primary controller on one processor, and ancillary operations processed by an ancillary processor. The primary and ancillary operations could be processed on one device, if and only if those operations are concurrent.

Control Coordination

The controls of the converters coordinate to balance power flow and direction in the CSPR. This coordination allows different control strategies, such as Predictive Energy Optimization or the CSPR acting as an uninterrupted power supply.

Emergency Backup Operation

The CSPR is able to use energy from energy storage and power from the PV panels to supply power to the ac load. This operation may require the distribution board to be locked out from the grid by opening a set of switches.

Failsafe Operation of Controls

Grid Edge Power Control, Emergency Backup Operation, certain statuses of converters and hardware, or other events may cause the failsafe operation of one or more controls. This failsafe control prevents other forms of operation, such as Predictive Energy Optimization.

Limited Power Point Tracking

Limited Power Point Tracking (LPPT) can be used by a dc-dc Converter to set a limited amount of power flow from the PV panels. When there is no limit for the power flow, the PV generation system will work under Maximum Power Point Tracking (MPPT) mode.

Model-Based Predictive Dual-Phase-Shift Control (MPDPC)

Figure 22:
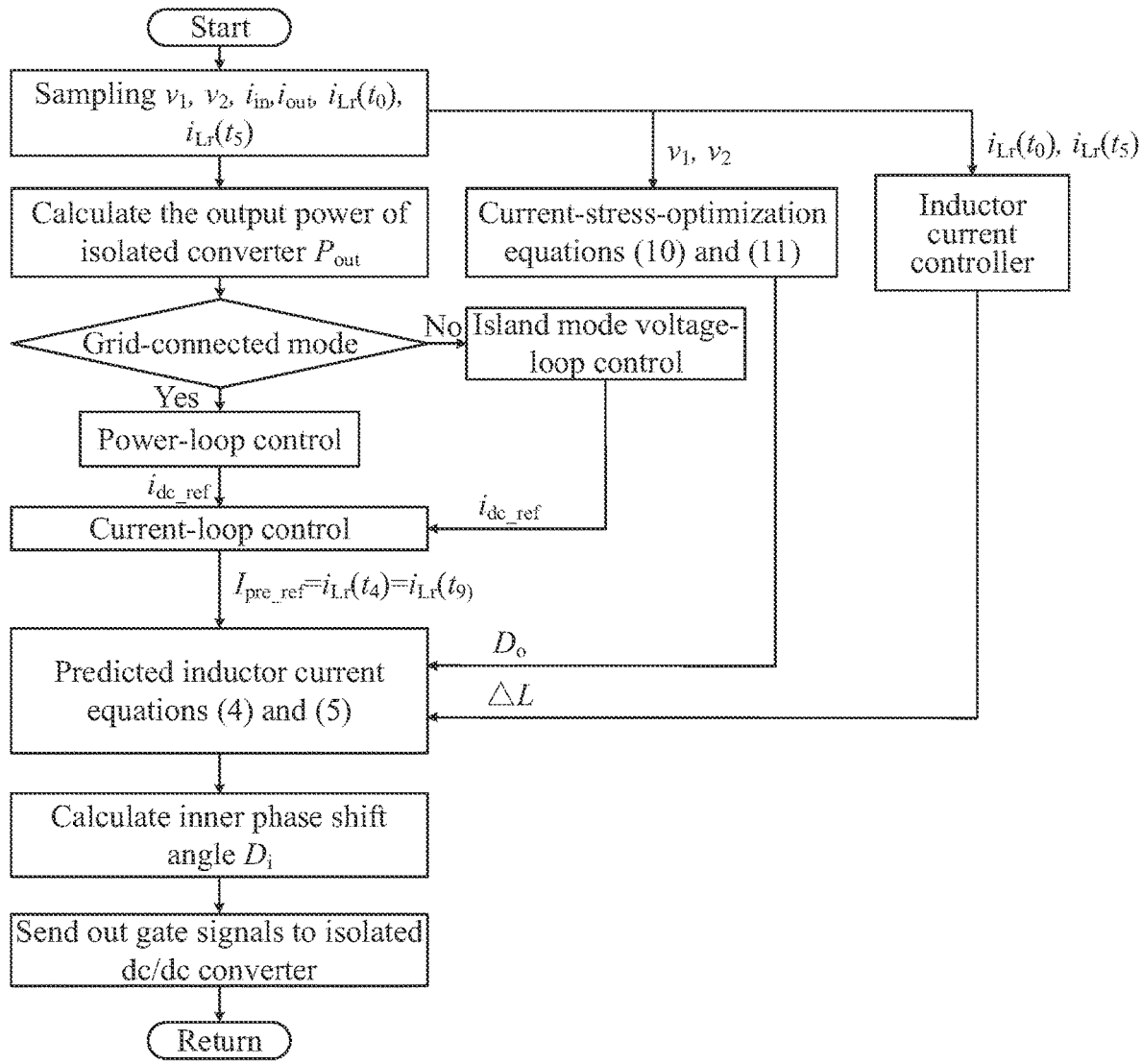
FIG. 22 shows the Model-based Predictive Dual-Phase-Shift Control (MPDPC).

As understood from FIG. 22, an isolated bidirectional dc-dc converter model specifies the input-output relationship of the currents and voltages. A discrete-time model is derived from the continuous-time model to predict the system's future behavior. A Lagrangian function is derived to determine the optimized phase-shift ratio of the input and output of the dc-dc converter. The Lagrangian function and predictive continuous-time-model are used to find the outer phase-shift ratio, Do. The phase-shift ratio Di is used to control the operation of the dc-dc converter.

Coordination Grid Edge Power Control

Figure 23:
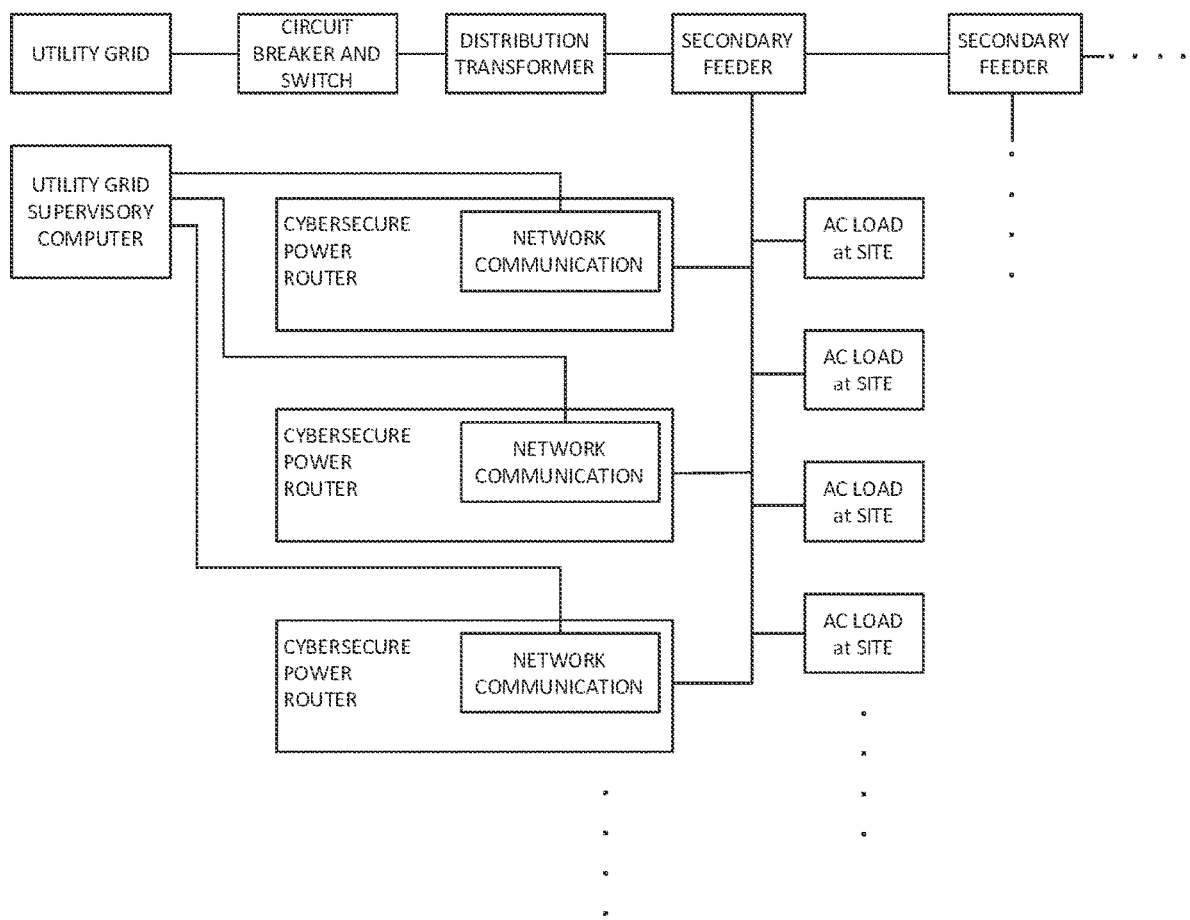
FIG. 23 shows the Coordination Grid Edge Power Control.

FIG. 23 shows how network communication and grid voltage can be used by the CSPR to control, partly or fully, grid edge power. Sites of various type, such as residences, commercial buildings, industrial plants, etc., are connected to the grid through secondary feeders, a distribution transformer, a circuit breaker and switches. These sites may or may not have a CSPR. Power flow may be between sites, from the grid into the site, or from the site into the grid (reverse power flow operation). The power sent to the grid comes from the on-site resources, such as energy storage and PV panels. Network communication and a utility grid supervisory computer can be used to set the amount of power flow for each CSPR.

Generation Prediction

Weather data, location, time of year, physical orientation, efficiency, and other details can be used to predict on-site energy generation. This energy can be generated by PV panels, wind turbines, generators, or other sources. The energy generation prediction can be used in an optimization of energy use.

Load Prediction

Time of year, weather prediction, and the history of energy usage can be used to predict on-site loads. The load prediction can be communicated to the grid and used in an optimization of energy use.

Time of Use Pricing

Time of Use pricing from a utility can be internally stored for a year or communicated through a network (e.g. SCADA) connection. This pricing list can be used in an optimization of energy use.

Battery Health Monitoring

The storage capacity of batteries diminished with time, rates of charge or discharge, amounts of energy stored within them, and excessive voltages. Battery Health Monitoring uses sensed battery voltages and currents to inform models of the batteries. Sensed battery voltages and currents can also be used by the dc-dc converter controls to prevent or control operations of the batteries.

Predictive Economic Optimization

Figure 24:
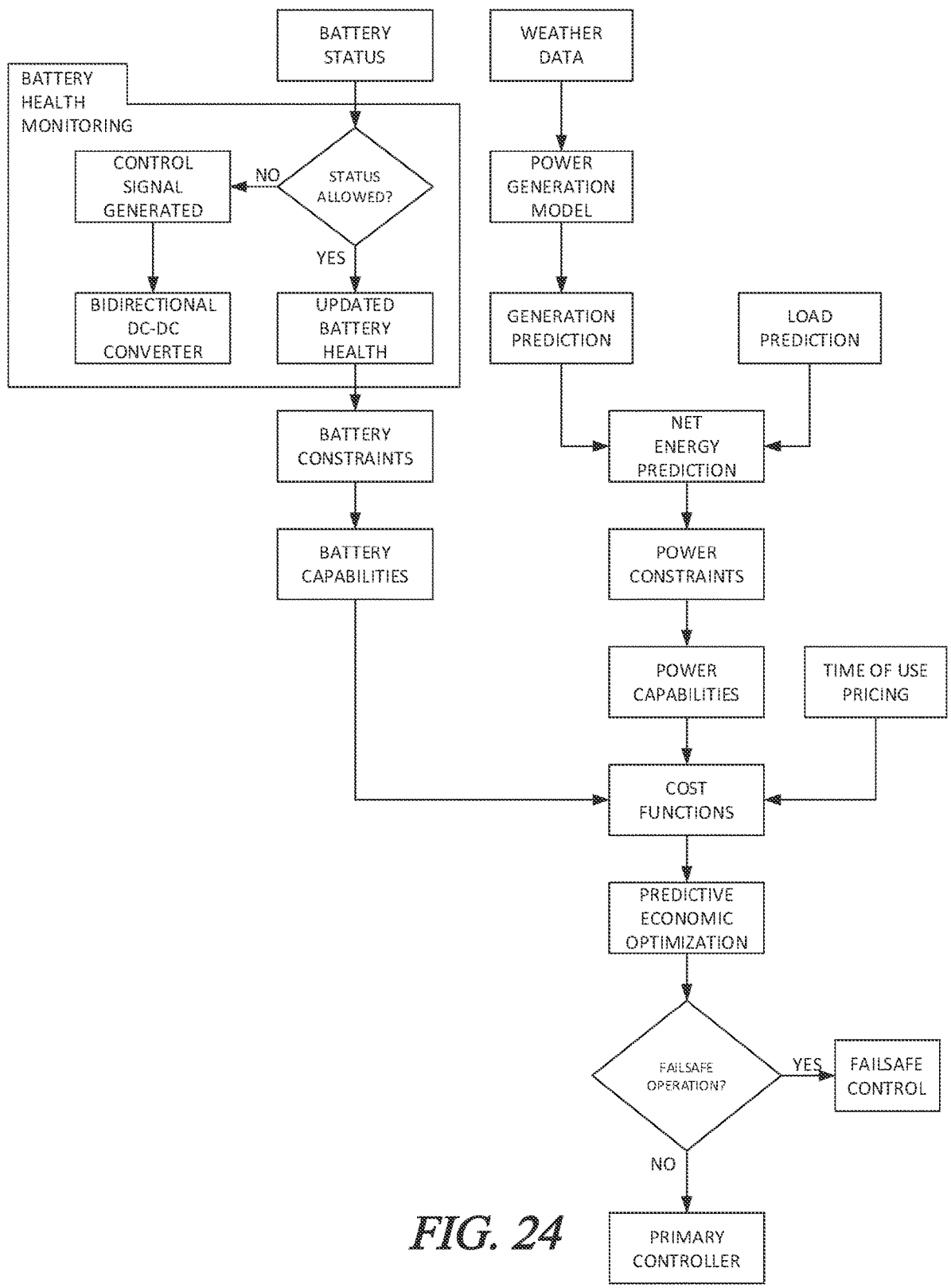
FIG. 24 shows the Predictive Economic Optimization.

FIG. 24 shows how the Generation Prediction and Load Prediction are summed to create a net energy prediction. The net energy prediction, Time of Use Pricing, and Battery Health Monitoring are constrained by system capabilities. Cost functions are created from these constrained sets. These cost functions and the possible ways of dispatching or storing energy are evaluated by an optimization algorithm. This optimization algorithm finds the most economic method to dispatch or store energy. This method of energy dispatch or storage sets the direction power flow through the dc-dc converters and dc-ac converter. Events, such as emergency backup operation, can interrupt predictive economic optimization operation. Economic optimization operation can be interrupted by various events, including the CSPR acting as an emergency power supply.

Network Communication

Network communication allows control of the CSPR by an outside entity, such as a user or power utility. The network may use Ethernet, cellular communication, wireless, or other physical layers. This network communication might use standard communication protocols, such as Modbus or IEC 61850. Payloads of data are encrypted, and are decrypted by the CSPR. Error detection is used to check the integrity of packets of communicated data. Communicated commands are validated before execution.

Error Detection

Error detection, such as a cryptographic hash function, is used to check the integrity of received communications.

Command Validation

Figure 25:
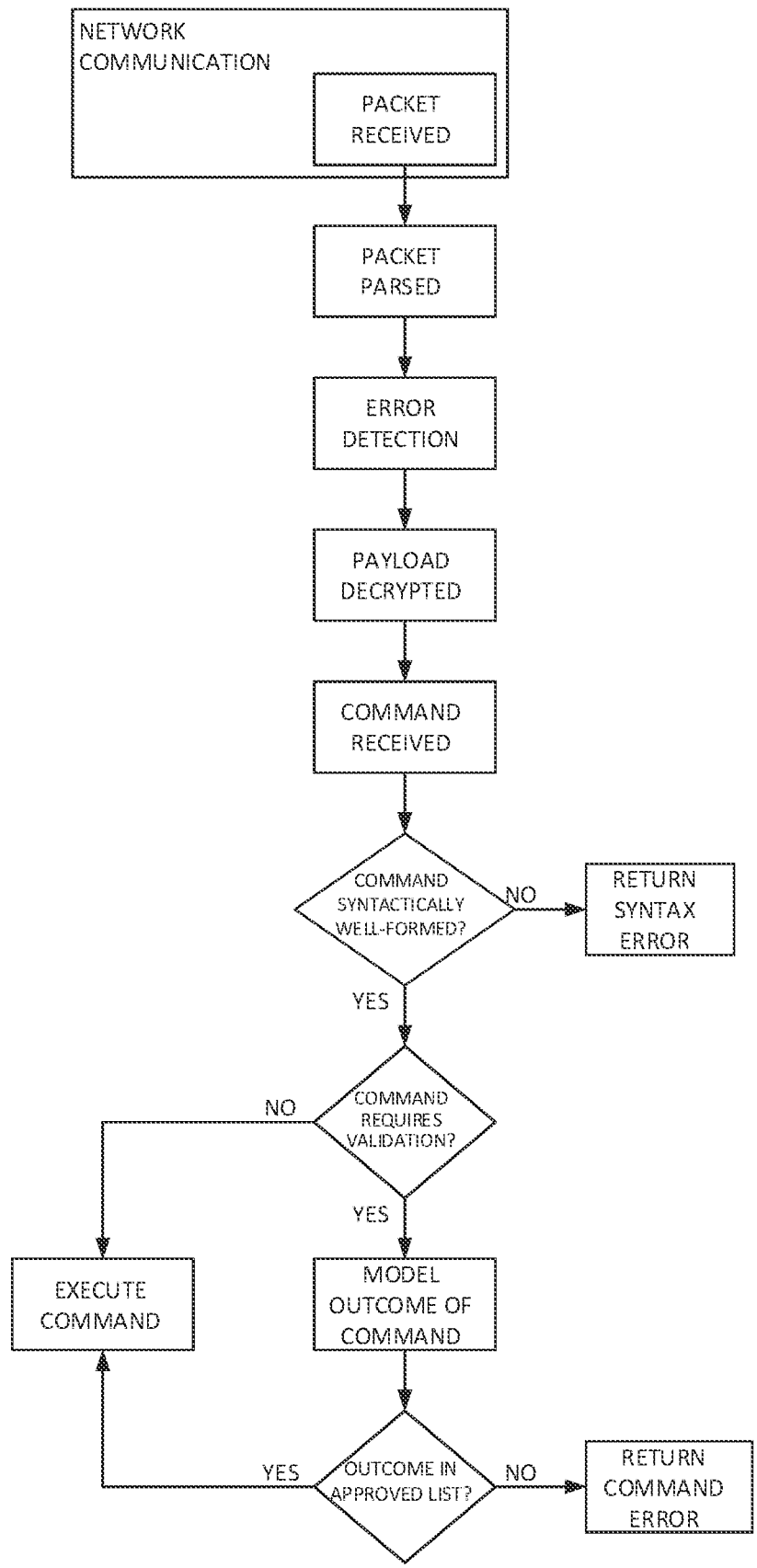
FIG. 25 shows the Command Validation.

FIG. 25 the shows how received commands are evaluated before execution. The command is checked for syntax errors. The command is evaluated in a system model to determine the expected outcome. If the outcome is part of an approved set, it is then executed.

Encrypted Communication

Figure 26:
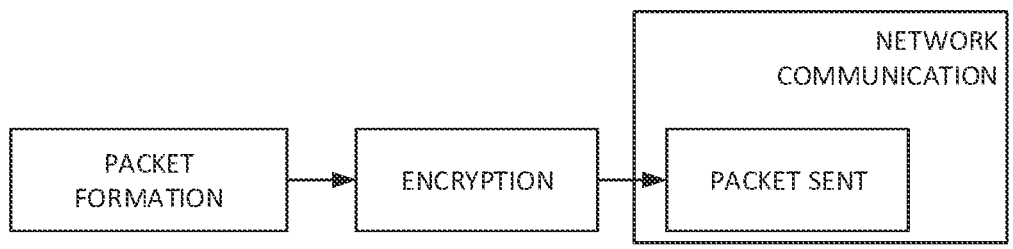
FIG. 26 shows the Encrypted Communication.

IS FIG. 26 shows the process overview for how all network communication payloads from CSPR are encrypted.

Encrypted Internal Communication

All internal communication is encrypted. This includes EEPROM memory access and communication between processors.

Firmware Integrity Check

Figure 27:
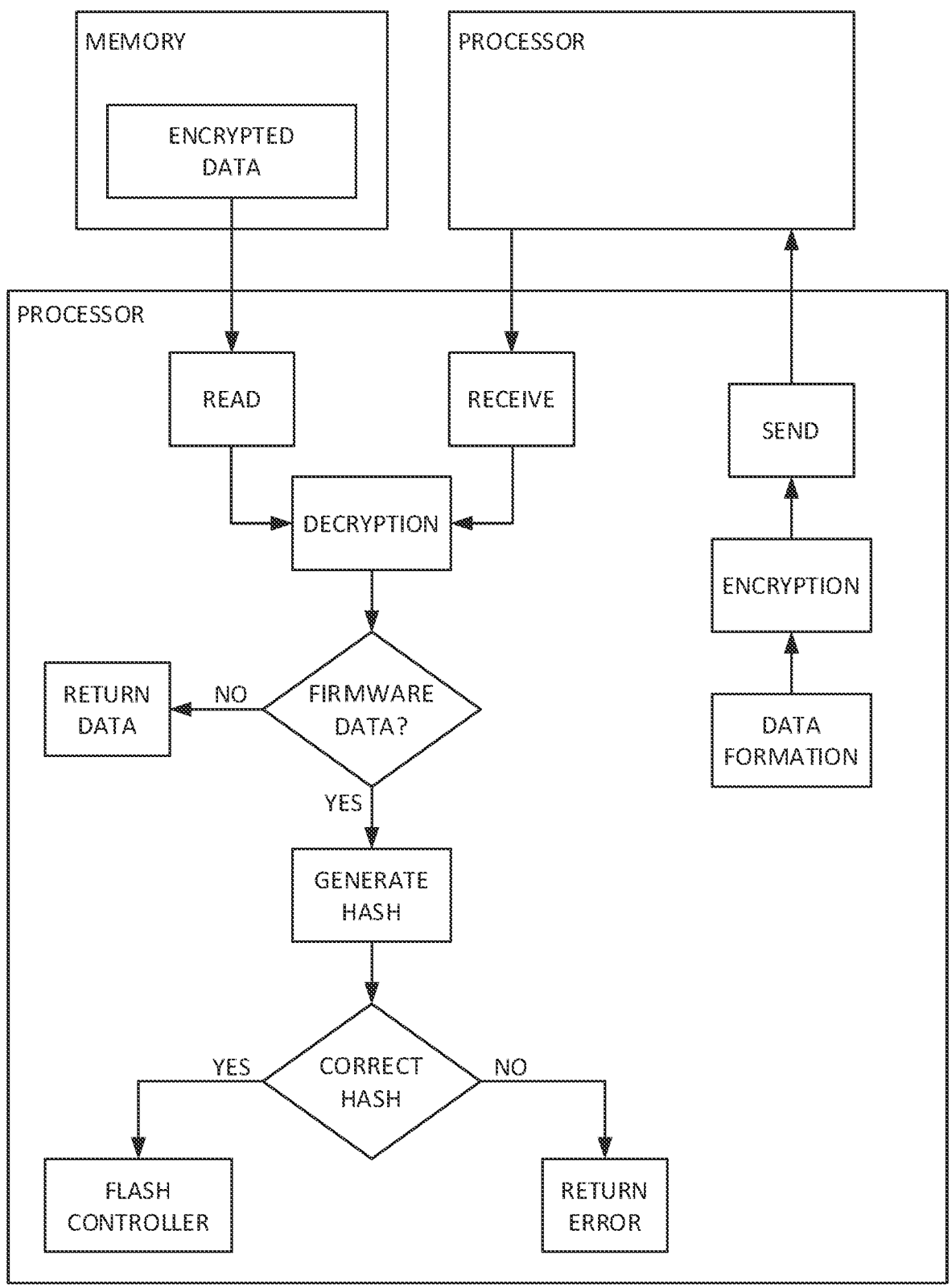
FIG. 27 shows the Firmware Integrity Check.

FIG. 27 then shows how error-detection is used on all firmware prior to flashing. A cryptographic hash function is generated from the firmware and compared against the stored hash value. If valid, the firmware is flashed onto the controller.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. An energy management method for the energy management control of a smart green power node apparatus, the energy management method comprising:
   providing control algorithms for a physical layer and a system layer, the physical layer including a converter stage, an input side having an input voltage and an input current, and an output side having an output voltage and an output current, the system layer including power command generation, operational mode determination, and energy-predictive control,
   first, determining multiple discrete time models for the dual active bridge converter which can be combined to form a dual active bridge continuous time model that specifies the input-output relationship of the input voltage, input current, and output voltage and output current, the discrete time models including a first discrete time model;
   second, selecting the first discrete-time model to predict the system's future behavior, the behavior prediction including physical circuit layer behavior and system primary and secondary layers behavior,
   third, providing the circuit layer control by using discrete control in dual-phase shift control in the dc/dc stage which has higher efficiency and transient response capability than single-phase shift;
   fourth, constructing a Lagrangian function to determine the optimized phase-shift ratio, Di, this is the phase angle that is only for the primary side switches in dual-active bridge;
   fifth, using the predicted dual-phase shift control to calculate an outer phase-shift ratio, Do, the phase angle between primary side switches and secondary side switches such that the voltage level across the transformer becomes 7-level and produces less current stress to semiconductor switches;
   sixth, implementing the optimized phase-shift ratio Di and Do to the gate control circuits to operate the dual active bridge converter;
   seventh, selecting the voltage/power command and operation mode in circuit layer using the system layer control;
   eighth, controlling in the system layer the energy condition monitoring, energy predictive control, energy storage control, and energy dispatch control;
   ninth, using communications in the primary layer and secondary layer including connecting to the internet and other power routers in a community, to predict and make a daily operational energy management plan based on time of use pricing, and/or historical usage data and/or weather data indicative of expected irradiance;
   tenth, the LPPT limitation algorithm in the system layer including the coordinated control with energy storage and renewable energy generation selection in power maximum or limitation mode;
   eleventh, using an architecture that defines defense-in-depth, multi-layered security protection from the hardware layer, the physical controls layer, and the internal and external communications layers;
   twelfth, providing an islanded mode of operation for energy management in the event that the electric power grid goes down; and
   thirteenth, providing an autonomous mode of operation, either grid-connected or islanded, when external communications are absent.

2. A smart green power node, comprising:
a processor providing predictive asset allocation based on weather forecast power.

3. A smart green power node, comprising:
optimization of power management based on power usage predictions coupled with machine learning algorithms based on historical usage data, and
back-up power/islanding capability power of the smart green power node.

* * * * *